US006331983B1

(12) United States Patent
Haggerty et al.

(10) Patent No.: US 6,331,983 B1
(45) Date of Patent: *Dec. 18, 2001

(54) MULTICAST SWITCHING

(75) Inventors: William T. Haggerty, Dunstable, MA (US); Phillip Andlauer, Londonderry; Stephen H. Negus, Windham, both of NH (US)

(73) Assignee: Enterasys Networks, Inc., Rochester, NH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/852,188

(22) Filed: May 6, 1997

(51) Int. Cl.[7] .................................................. H04L 12/66
(52) U.S. Cl. ......................... 370/400; 370/432; 370/475
(58) Field of Search ................................. 370/389, 390, 370/392, 393, 400, 401, 432, 402, 403, 404, 405, 406, 407, 408, 475

(56) References Cited

U.S. PATENT DOCUMENTS

| | | | | |
|---|---|---|---|---|
| 4,740,954 | * | 4/1988 | Cotton et al. ........................ | 370/432 |
| 4,864,559 | * | 9/1989 | Perlman ............................... | 370/400 |
| 5,634,011 | * | 5/1997 | Auerbach et al. .................... | 370/400 |
| 5,684,800 | * | 11/1997 | Dobbins et al. ...................... | 370/401 |
| 5,818,838 | * | 10/1998 | Backes et al. ........................ | 370/390 |

OTHER PUBLICATIONS

Macedonia et al., "MBone Provides Audio and video Across The Internet," ftp://taurus.cs.nps.navy.mil/pub/mbmg/mbone.html, Jan. 27, 1997 (8 pages).

Stardust Technologies, Inc., "Introduction To IP Multicast Routing, An IP Multicast Initiative White Paper," IP Multicast Initiative, Jan. 12, 1997 (15 pages).

Stardust Technologies, Inc., "IP Multicast Backgrounder, An IP Multicast Initiative White Paper," http://www.ipmulticast.com/community/whitepapers/backgrounder.html, Jan. 22, 1997 (7 pages).

Stardust Technologies, Inc., "IP Multicast: Glossary of Terms, An IP Multicast Initiative Document," http://www.ipmulticast.com/community/whitepapers/glossary.html, Jan. 22, 1997 (7 pages).

(List continued on next page.)

*Primary Examiner*—Ricky Ngo
(74) *Attorney, Agent, or Firm*—Wolf, Greenfield & Sacks, P.C.

(57) ABSTRACT

Method and apparatus for establishing connections in a switch-based communications network for multicast traffic. A source receives a multicast packet on an access port from a source host, determines a group address in the multicast packet, and composes and sends a "sender present" message to other switches on its network ports. The receiving switches determine whether a local host wishes to join the group and if so, send a map message back toward the source switch on a predetermined path between the receiving switch and the source switch. A map message may terminate at a switch on the path that already has a connection for this group/source pair, and join into this connection as an additional output port. In this manner, a "signal out, connect back" method is provided for establishing a connection path from the sender to multiple receivers. In addition, multicast traffic can be sent across a switch/router interface in either direction, providing for controlled multicast traffic between router-based networks and switch-based networks.

36 Claims, 21 Drawing Sheets

OTHER PUBLICATIONS

Stardust Technologies, Inc., "How IP Multicast Works, An IP Multicast Initiative White Paper," http://www.ipmulticast.com/community/whitepapers/howipmcworks.html, Jan. 22, 1997 (8 pages).

Semeria et al., "Introduction To IP Multicast Routing," http://www.stardust.com/ipmulticast/community/semeria.html, Jan. 27, 1997 (44 pages).

Auerbach, J. et al., "Multicast Group Membership Management In High Speed Wide Area Networks," International Conference on Distributed Computing Systems, Arlington, Texas, May 20–24, 1991, No. CONF. 11, May 20, 1991, pp. 231–238.

Deering, S. et al., "Multicast Routing In Datagram Internetworks and Extended LANs," ACM Transactions on Computer Systems, vol. 8, No. 2, May 1, 1990, pp. 85–110, XP000137193.

Cheriton, D. et al., "Host Groups: A Multicast Extension For Datagram Internetworks," High Performance Light–Weight Fuel Cell Electrodes, Sep. 10, 1985, pp. 172–179, XP000560608.

* cited by examiner

MULTICAST SWITCHING

FIELD OF THE INVENTION

The present invention relates to a method and apparatus for controlling the flow of multicast traffic on a communications network, and more particularly to a method and apparatus for establishing a connection path for multicast traffic through a switched network, and across router/switch boundaries, which conserves network bandwidth.

BACKGROUND OF THE INVENTION

Many emerging Internet applications are one-to-many or many-to-many, where one or multiple sources are sending to multiple receivers. Examples include the transmission of corporate messages to employees, communication of stock quotes to brokers, video and audio conferencing for remote meetings and telecommuting, and replicating databases and web site information. IP multicast efficiently supports these types of transmission by enabling sources to send a single copy of a message to multiple recipients who explicitly want to receive the information. This is far more efficient than requiring the source to send an individual copy of a message to each requestor (referred to as point-to-point unicast, in which case the number of receivers is limited by the bandwidth available to the sender). It is also more efficient than broadcasting one copy of the message to all nodes on the network, since many nodes may not want the message, and because broadcasts are limited to a single subnet.

Multicast is a receiver-based concept: receivers join a particular multicast session group and traffic is delivered to all members of that group. The sender does not need to maintain a list of receivers. Only one copy of a multicast message will pass over any link in the network, and copies of the message will be made only where paths diverge at a router. In this way, IP multicasting yields performance improvements and conserves bandwidth end-to-end.

Multicasting has existed for several years on local area networks (LANs), such as Ethernet and Fiber Distributed Data Interface (FDDI). However, it was not until the development of IP multicast addressing, now an Internet standard (Request For Comment 1112), that such group communication could be established across the Internet.

Multicast communications across the Internet are implemented on "MBone," short for Multicast Backbone, a virtual network that has been in existence since early 1992. MBone is referred to as a virtual network because it shares the same physical media as the Internet. It uses a network of routers (mrouters) that can support multicast. In portions of the Internet where multicast routers are not yet implemented, multicast packets can be sent through Internet IP routers by encapsulating the multicast packets inside regular IP packets—referred to as "tunneling." It is expected that most commercial routers will support multicast in the near future, eliminating the need for the "tunneling" scheme.

The key to understanding MBone performance is to focus on bandwidth. See "MBone Provides Audio and Video Across The Internet," by Michael R. Macedonia and Donald P. Brutzman, Naval Postgraduate School, available on the Internet at "ftp://taurus.cs.nps.navy.mil/pub/mbmg/mbone.html." The reason multicast is bandwidth/efficient is that one packet can reach all workstations on a network. Thus, a 128-kilobit per second video stream (typically 1 to 4 frames per second) uses the same bandwidth whether it is received by one workstation, or 20. However, such a multicast stream would ordinarily be prevented from crossing network boundaries (e.g., ordinary routers). These boundaries, or firewalls, were implemented to prevent the entire Internet from quickly becoming saturated with such streams. For this reason, multicast routers must implement a special protocol to allow controlled distribution of multicast packets. One such protocol limits the lifetime of multicast packets. A second uses sophisticated pruning algorithms to adaptively restrict multicast transmission. For the most part, the MBone now uses thresholds to truncate broadcasts to the leaf routers. The truncation is based on the setting of a time-to-live (TTL) field in a packet that is decremented each time the packet passes through an mrouter. For example, a TTL value of 16 would limit a multicast stream to a campus, as opposed to a value of 127 or 255, which might send a multicast stream to every subnet on the MBone (currently about 13 countries).

Controlling the transmission of multicast packets can have a major impact on network performance. For example, a default video stream consumes about 128 Kbps of bandwidth, or nearly 10% of a T1 line (a common site-to-site link on the Internet). Several simultaneous high-bandwidth sessions might easily saturate the network links and routers.

When a host on an MBone-equipped subnet establishes or joins a multicast session, it announces that event via the Internet Group Management Protocol (IGMP). A designated mrouter on the subnet forwards that announcement to the other mrouters in the network. Groups are disbanded when everyone leaves, freeing up the IP multicast address for future reuse. The designated mrouter occasionally polls hosts on the subnet to determine if any are still group members. If there is no reply by a host, the mrouter stops advertising that host group membership to the other multicast routers.

Mbone routing protocols are still being developed. Most MBone routers use the Distance Vector Multicast Routing Protocol (DVMR); however, some researchers consider this method inadequate for rapidly-changing network topology because the routing information propagates too slowly. The Open Shortest Path (OSP) working group has proposed a multicast extension to the Open Shortest Path Link-State Protocol (OSPLSP), which is designed to propagate routing information more quickly. With either protocol, mrouters must dynamically compute a source tree for each participant in a multicast group.

MBone researchers are currently developing new applications for multisender/multireceiver network traffic. Session availability is dynamically announced using a tool called sd (session directory), which displays active multicast groups. The sd tool also launches multicast applications and automatically selects unused addresses for new groups. Video, audio and a shared drawing whiteboard are the principal MBone applications, provided by software packages called nv (net video), vat (visual audio tool), and wb (whiteboard). The principal authors of these tools are Ron Frederick of Xerox, Palo Alto Research Center, Calif. USA (for nv), and Steve McCanne and Van Jacobson of the University of California Lawrence Berkeley Laboratory, Berkeley, Calif. USA (for sd, vat and wb). Each program is available in executable form without charge from various file-transfer protocol sites in the Internet, and working versions are available for Sun, Silicon Graphics, DEC and Hewlett-Packard architectures.

The following background information on IP multicasting will be useful in understanding the present invention. This information was taken from: "How IP Multicast Works," a draft paper by the IP Multicast Initiative (IPMI), available from Stardust Technologies, Inc., 1901 Bascom Avenue, No.

333, Campbell, Calif., 95008 USA, and from the website: www.ipmulticast.com.

IP Multicasting (Background)

IP multicast is an extension to the standard IP network-level protocol. RFC1112, Host Extensions For IP Multicasting, authored by Steve Deering in 1989, describes IP multicasting as: "the transmission of an IP datagram to a 'host group', a set of zero or more hosts identified by a single IP destination address. A multicast datagram is delivered to all members of its destination host group with the same 'best-efforts' reliability as regular unicast IP datagrams. The membership of a host group is dynamic; that is, hosts may join and leave groups at any time. There is no restriction on the location or number of members in the host group. A host may be a member of more than one group at a time." In addition, at the application level, a single group address may have multiple data streams on different port numbers, on different sockets, in one or more applications. Multiple applications may share a single group address on a host.

To support IP multicast, the sending and receiving end systems (nodes) and network infrastructure between them (including intermediate routers) must be multicast-enabled. The end node hosts are required to have:

support for IP multicast transmission and reception in the TCP/IP protocol stack;

software supporting Internet Group Management Protocol (IGMP) to communicate requests to join a multicast group(s) and receive multicast traffic;

network interface cards which efficiently filter for LAN data link layer addresses (e.g., MAC addresses) mapped from network layer IP multicast addresses;

IP multicast application software, such as video conferencing.

To run IP multicast on a LAN, only the above are needed—no routers need be involved. However, to expand IP multicast traffic to a wide area network (WAN) requires:

all intermediate routers between the sender(s) and receiver(s) must be IP multicast capable;

firewalls may need to be reconfigured to permit IP multicast traffic.

It is also possible to implement an IP multicast-aware switch which provides the same benefits as the multicast router, but in a local area network. Without one, the multicast traffic would be sent to all segments on the local subnet. An IP multicast aware switch could be used to automatically set up multicast filters so that the multicast traffic is only directed to the participating end nodes.

IP Multicast Addressing

IP multicast uses Class D Internet protocol addresses, those with 1110 as their high-order four bits, to specify multicast host groups. In Internet standard, "dotted decimal" notation, host group addresses range from 224.0.0.0 to 239.255.255.255. Two types of group addresses are supported—permanent and temporary. For example, a permanent address of 224.0.0.1, has been assigned by the Internet Assigned Numbers Authority (IANA), as the "all-hosts group" used to address all IP multicast hosts on a directly connected network, and 224.0.0.2 which addresses all routers on a LAN. The range of addresses between 224.0.0.0 and 224.0.0.255 is reserved for routing protocols and other low-level topology discovery and maintenance protocols.

To send an IP multicast datagram (packet), the sender specifies the IP multicast group address, which represents a host group. IP multicast packets are sent using the same "Send IP" operation used for unicast packets.

Reception of IP multicast packets is more complex. To receive packets, a user's host application requests membership in the multicast host group associated with a particular multicast session (e.g., "I want to review today's press conference with the President"). This membership request is communicated to the LAN router and, if necessary, onto intermediate routers between the sender and the receiver. As another consequence of its group membership request, the receiving host network interface card starts filtering for the LAN-specific hardware (data-link or MAC layer) addresses associated with the new multicast group address. WAN routers deliver the requested incoming multicast packets to the LAN router, which maps the host group address to its associated hardware address and builds the message (for example, an Ethernet frame) using this address. The receiving host network interface card and network driver, listening for these addresses, pass the multicast messages to the TCP/IP protocol stack, which makes them available as input to the user's application, such as a video viewer.

Whereas an IP unicast address is statically bound to a single local network interface on a single IP network, an IP multicast group address is dynamically bound to a set of local network interfaces on a set of IP networks. The multicast routers do not need to know the entire list of member hosts for each group—only the groups for which there is at least one interested member on its subnet. Thus, a multicast router attached to an Ethernet need associate only a single Ethernet multicast address with each host group having a local member.

Time-To-Live Field

Each IP multicast packet uses a time-to-live (TTL) field in the IP header to control the number of hops that the packet is allowed to propagate. Each time a router forwards a packet, its TTL is decremented. A multicast packet whose TTL has expired (is 0) is dropped (without an error notification to the sender). A local network multicast reaches all immediately-neighboring members of the destination host group (the TTL is 1 by default). If a multicast packet has a TTL greater than 1, a multicast router attached to the local network takes responsibility for Internetwork forwarding. The datagram is forwarded to other networks that have members of the destination group. On those other member networks that are reachable within the time-to-live, an attached multicast router completes delivery by transmitting the datagram as a local multicast. Thus, TTL thresholds in multicast routers prevent datagrams with less than a certain TTL from traversing certain subnets; this provides a convenient mechanism for confining multicast traffic to within campus or enterprise networks. Several standard settings for TTL are specified for the MBone: 1 for local net, 15 for site, 63 for region, and 127 for the world.

IGMP

The Internet Group Management Protocol (IGMP) is used by multicast routers to learn the existing host group members on their directly attached subnets. The multicast router does so by sending IGMP queries and having IP hosts report their host group membership. IGMP is an Internet standard defined in RFC1112.

IGMP messages are encapsulated in IP datagrams. IGMP has only two kinds of packets: Host Membership Queries and Host Membership Reports.

To determine if any host on a local subnet belongs to a multicast group, one multicast router per subnet periodically sends a hardware (physical or data-link layer) IGMP Host Membership Query to all IP end nodes on its LAN, asking them to report back on the host group memberships of their processes. This query is sent to the "all-hosts" group network address (224.0.0.1) and a TTL of 1 is used so that these queries are not propagated outside of the LAN. Each host sends out one IGMP Host Membership Report message per host group, sent to the group address, so that all group members see it.

When a process asks its host to join a new multicast host group, the driver creates a hardware multicast group address, and an IGMP Host Membership Report with the group address is immediately sent. The host network interface is expected to map the group address to local network addresses as required to update its multicast reception filter. Each host keeps track of its own group memberships, and when the last process on a host leaves a group, that group is no longer reported by the host.

Periodically, the local multicast router sends an IGMP Host Membership Query to the "all-hosts" group, to verify current memberships. If all member hosts responded at the same time, undue traffic congestion would result. This is avoided by having each host delay the report by a random interval if it has not seen a report for the same group from another host. As a result, only one membership report is sent in response for each active group address, although many hosts may have memberships.

IGMP updates are used by multicast routing protocols to communicate group memberships to neighboring routers, thus propagating group information through the Internet. The bandwidth needed to transmit such group information is usually small compared to the multicast application traffic, so this propagation method is beneficial.

Multicast Routing Protocols

Multicast routing protocols present a more complex problem. The Internet is composed of a plurality of subnetworks connected by routers. When the source of a message is located on one subnet and the destination is located on a different subnet, there must be some way to determine how to get from the source to the destination. This is the function of the IP protocol. Each host on the Internet has a unique address that identifies its physical location; part of the address identifies the subnet on which it resides and part identifies the particular host on that subnet. Routers periodically send routing update messages to adjacent routers, conveying the state of the network as perceived by the particular router. This data is recorded in routing tables that are then used to determine optimal transmission paths for forwarding messages across the network. Because a unicast transmission is directed towards a single physical location that is specified by the host address, the routing procedure is relatively straightforward—i.e., binding of a single address to a single host.

However, routing multicast traffic is more complex. A multicast group address identifies a particular transmission session, rather than a specific physical destination. An individual host is able to join an on-going multicast session by using IGMP to communicate this desire to its subnet router. A simplistic approach to sending data to multiple receivers would be for the source to maintain a table identifying all of the receiving subnets participating in a session, and to send a separate copy of the data to each receiving subnet. However, this would be an extremely inefficient use of bandwidth, since many of the data streams follow the same path throughout much of the network.

New multicast routing protocols are being developed to address the problem of efficiently routing multicast traffic. Since the number of receivers of the multicast session can potentially be quite large, the source should not have to know all of the relevant addresses. Instead, the network routers should be able to translate multicast addresses into host addresses. The basic principle involved in multicast routing is that all routers interact with each other to exchange information about neighboring routers. To avoid duplication of effort, a single router is selected (via IGMP) as the designated router for each physical network.

For efficient transmission, designated routers construct a spanning tree that connects all members of an IP multicast group. A spanning tree has just enough connectivity so that there is only one path between every pair of routers, and it is loop-free. If each router knows which of its links belongs to the spanning tree, it can copy an incoming multicast packet onto each of its outgoing tree links, generating only the minimum needed number of copies. Messages are replicated only when the tree branches, thus minimizing the number of message copies that are transmitted through the network.

Since multicast groups are dynamic, with members joining or leaving a group at any time, the spanning tree must be dynamically updated. Branches in which no listing exists must be discarded (pruned). A router selects the spanning tree based on the network layer source address of the multicast packet, and prunes that spanning tree based on the network layer destination address.

IP multicast routing algorithms generally follow one of two basic approaches, depending on the distribution of multicast group members in the network. A first approach is based on the assumption that the group members are densely distributed throughout the network and bandwidth is plentiful, i.e., almost all hosts in the network belong to the group. These so-called "dense-mode" multicast routing protocols rely on periodic flooding of the network to set up and maintain the spanning tree. Dense-mode routing protocols include Distance Vector Multicast Routing Protocol (DVMRP), Multicast Open Shortest Path First (MOSPF), and Protocol-Independent Multicast-Dense Mode (PIM-DM).

A second approach is based on the assumption that multicast group members are sparsely distributed throughout the network and bandwidth is not necessarily widely available. It is important to note that the sparse mode does not imply that the group has only a few members, just that they are widely dispersed. In this case, flooding would unnecessarily waste network bandwidth and hence could cause serious performance problems. Thus, sparse mode protocols rely on more selective techniques to set up and maintain multicast trees. Sparse mode routing protocols include Core-Based Trees (CBT) and Protocol-Independent Multicast-Sparse Mode (PIM-SM).

Multicast Applications

Finally, many applications are now being developed to ensure real-time delivery so that, even with a time-critical application such as audio, participants perceive conversations as if they are in real time. This is achieved by a small buffering delay to synchronize and resequence the arriving voice messages. For example, RTP, the Real-Time Transport Protocol, provides end-to-end network transport functions suitable for applications transmitting real-time data, such as audio, video or simulation data, over multicast or unicast network services. RSVP, the ReSerVation Protocol, supports requests for a specific quality of service from the network for particular data streams or flows. RTSP, the Real-Time Streaming Protocol, is an application-level protocol for controlling delivery of data with real-time properties.

In summary, IP multicasts enable many new types of applications over the Internet,—e.g., transmission of corporate messages to employees, communication of stock quotes to brokers, video and audio conferencing for remote meetings and telecommunicating, and replicating databases and website information. However, many separately-managed corporate or enterprise internetworks are now being installed based on switches, rather than routers. In order to integrate these switched subnets into the router-based Internet, protocols are needed to ensure that select multicast traffic is transmitted onto the switched network, without generating excessive traffic or bottlenecks, and that multicast traffic can efficiently pass the router/switch interface in a reliable and controlled manner. The present invention is directed towards enabling the efficient transmission of multicast traffic in a switched network.

SUMMARY OF THE INVENTION

A first embodiment of the present invention is directed to a method for establishing switch connections in a switched communications network, in order to enable the transmission of multicast packets. The switched network includes a plurality of hosts and switches connected by links, each switch having at least one network port connected to another switch and at least some switches having access ports connected to one or more hosts. Each host has a unique (e.g., physical layer) address. Each switch includes a connection database of valid connections between different ports on the switch and a setup mechanism for establishing temporary connections between the different ports on the switch. A method of handling multicast packets is provided, wherein a source switch receives a multicast packet on an access port from a source host, the source switch determines a group address from the multicast packet, and the source switch composes and sends a sender present message, containing the group address and source host address, to other switches. This inter-switch communication enables the switches in the network to learn which sender host has multicast packets to send to a designated group.

A receiving switch receives the sender present message and determines whether a local host attached to one of its access ports wishes to join the group address identified in the sender present message. If yes, the receiving switch composes and sends a map message toward the source switch on a predetermined path, the map message containing the group address, the source host address, and the predetermined path between the receiving switch and source switch.

When a switch receives the map message, it determines if there is an entry in its connection table for the group address and source host address, and if yes, it adds an outport to the entry identifying the port on which the map message was received. In this manner, connection table entries are made to include the path on which future multicast packets will be sent through the switched network.

Alternatively, when a switch receiving the map message determines that there is no entry in its connection table for the group address and source host address, it adds an entry to its connection table for the group address, source host address, an inport identifying the port directed toward the source switch according to the predetermined path, and an outport identifying the port on which the map message was received. Again, this new entry in the connection table is for future multicast traffic. The receiving switch may then send the map message on the predetermined path toward the source switch.

Eventually, the switch receiving the map message is the source switch, at which point all switches on the path to the various destination hosts (in the group) will have appropriate entries in their connection tables. Thereafter, each switch on the path switches multicast packets based on its connection table entry.

In addition, the source switch determines whether any local host attached to any of its access ports wishes to join the group address identified in the multicast packet. If so, the source switch adds an entry to its connection table including the group address, the source host address, and an outport identifying the port to the local host wishing to join the group (to receive the multicast message).

If a host wishes to join a multicast session, the host will notify its local switch of this desire. The local switch then checks its connection table for an entry identifying the designated group address which the local host wishes to join, and if there is an entry, adds the access port on which the local host is connected as an outport for the connection table entry. If there is no entry, the local switch composes and sends a join group message to the other switches in the network, the join group message containing the designated group address and the local switch address.

A switch receiving the join group message determines if a local host connected to one of its access ports is the source host for the designated group address identified in the join group message. If it is, the receiving switch sends a sender present message to the local switch. Depending on the protocol, the receiving switch may also pass the join group message to other switches in the network. The local switch eventually receives any sender present message (note there may be plural senders). In this manner, the local switch is notified of the source of any multicast session for the designated group address.

In another embodiment, the switch receiving the join group message determines if a router is attached to one of its access ports. If so, the switch notifies the router that the switch wishes to join the group address identified in the join group message. This will enable all future multicast traffic designated for that group address to be sent from the router to the switch and the ultimate host in the switched network.

A second embodiment is directed to a router/switch interface, for example enabling a switched-based subnet to send and receive multicast traffic to and from a router-based Internet. In this embodiment, a local switch determines if it has an attached local router, and if so, the local switch joins all or a subset of multicast group addresses. For example, this may be accomplished by maintaining a database of receiving ports in each switch, for various multicast addresses. The receiver database would include the multicast group address, which may be a wildcard designating all multicast groups, and the port on which the router is attached for sending or receiving multicast traffic.

In another embodiment, a local switch receives a notice from a local host that the host wishes to join a designated group address. If a connection entry exists for the group address and source host address, the local switch adds the port on which the local host is connected as an outport for the connection table entry. If not, the local switch composes and sends a join group message to the other switches, the join group message containing the designated group address and the local switch address. The other switches respond to the join group message with a sender present message as previously described.

If no response is received by the local switch, the local switch remembers the local host's desire to join the group, i.e., maintains the request in memory. Then, upon receipt of a future sender present message it will establish a connection and respond with a map message.

In the above embodiments, the type of switch is not critical, e.g., it may be a packet-based switch, or a cell-based switch (ATM). The multicast packet transmitted by the switch is thus meant to include a standard multicast packet or a multicast packet encapsulated or otherwise divided into messages such as cells. Also, it is envisioned that there will be multiple senders in each session, and/or multiple sessions occurring simultaneously.

These and other features and benefits of the present invention will be more particularly described in regard to the following detailed description and drawing figures.

DETAILED DESCRIPTION

Unicast vs. Multicast Communications

Unicast applications send messages between one specific host address and another host address over the network. An example of such a unicast communications methodology, which sends messages separately, point-to-point, from one sender to one receiver, is shown in FIG. 1.

Figure 1:
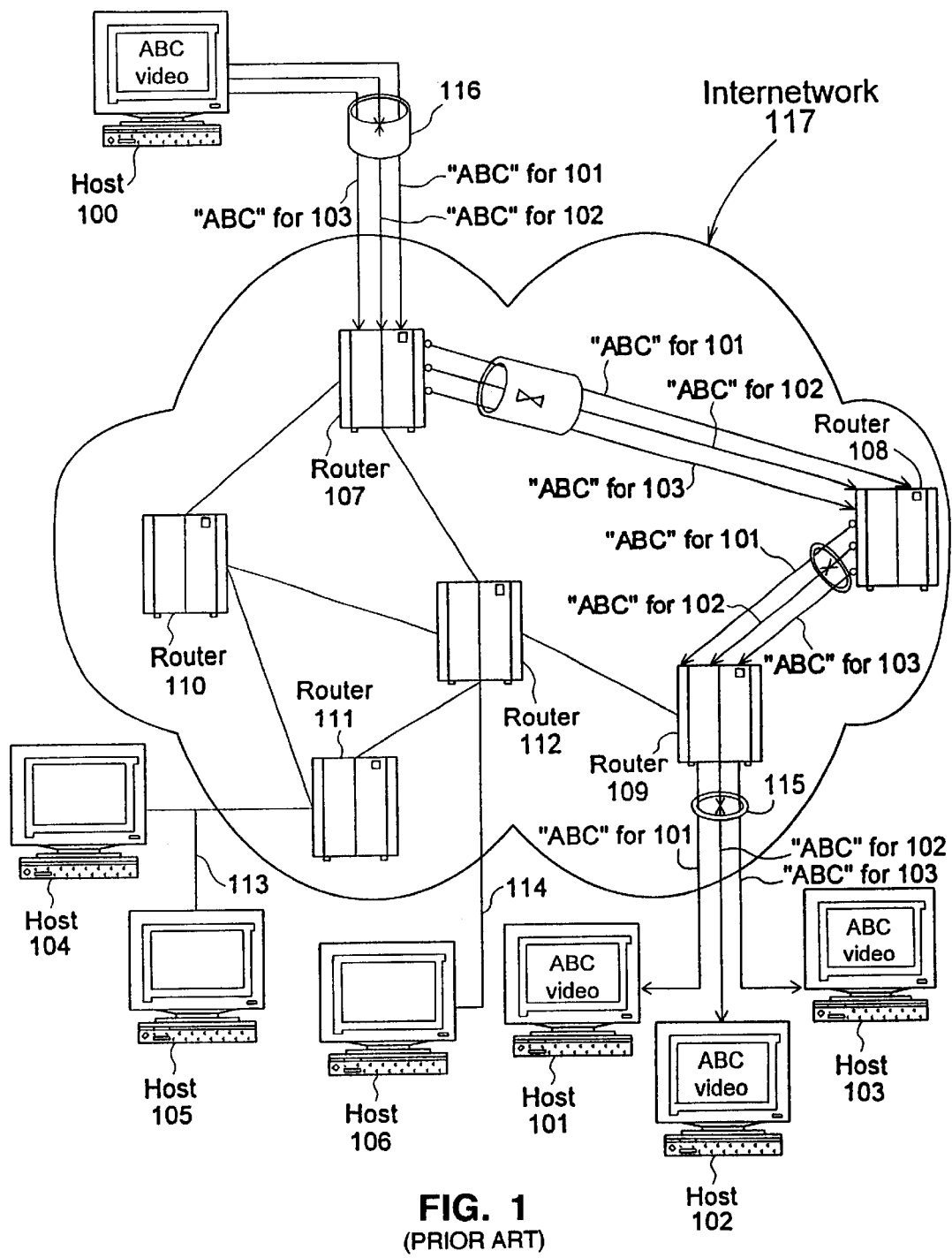
FIG. 1 is an illustration of a prior art router network utilizing unicast communications.

In FIG. 1, internetwork 117 is a computer network comprising interconnected routers 107–112 and sub-networks (subnets) 113–116. Computer hosts 100–106 are connected to sub-networks 113–116. The internetwork, its routers, subnets, and hosts, are collectively referred to as the network. Hosts 100–106 may send messages between one another in the form of packets. Routers 107–112 route the packets over the internetwork between hosts, based on packet addresses. A host connected to a router via a subnet is referred to as a local host for that router. For example, local hosts 101–103 on local subnet 115 are attached to local router 109.

As a unicast example, suppose host 100 has a stream of video data, labeled "ABC", which is to be sent to hosts 101–103 across the internetwork 117. To do so, host 100 must place a frame of the "ABC" video data into a packet addressed for host 101, and send this packet to host 101. Host 100 must place another copy of the "ABC" video data into a separate packet addressed for host 102, and send this packet to host 102. Host 100 must repeat the process with yet another separate packet for host 103. The individual nature and separate propagation of each "ABC" video data packet over the network is shown by three separate lines labeled "ABC" for 101, "ABC" for 102, and "ABC" for 103. Three separate packets travel over the same link. The routers 107–109 must create and transmit three packets (one for each receiving host) for every frame of video data.

Each single packet contains source and destination address fields designating the sending and receiving host addresses, respectively. Routers 107–112 contain packet routing tables and routing algorithms which determine where to send a packet, based on this addressing information. Each packet received by a router is examined for its destination address, and then transmitted to the next router, referred to as the next "hop", on the network towards its final destination host. In this example, the "ABC" video data packets sent from host 100 are received by router 107, are examined, and are then sent to router 108. Upon packet reception, router 108 consults its routing table and routes each separate packet to router 109. Finally, router 109 receives the "ABC" packets destined for hosts 101–103 and routes them to its local subnet 115 to be received by their respective destination hosts.

Router networks are slow due to the processing required to determine where each packet is to be sent. Live, real-time video data streams may require hundreds or thousands of packets in sequence. A separate individual "stream" of packets would have to be created for each receiving host. Network bandwidth (the amount of packets or data sent through any one point in the network) is greatly increased by the requirement for separate point-to-point transmissions from a single sender to each of the separate receivers. If the volume of packets were increased, or the number of receiving hosts grows too large (thus increasing the number of separate packet transmissions), a point would be quickly reached where network bandwidth and processing power of routers would be exceeded and packets would be lost or "dropped". Unicast transmission of high-bandwidth data streams thus allows only a limited number of participant senders and receivers due to these limitations.

Figure 2:
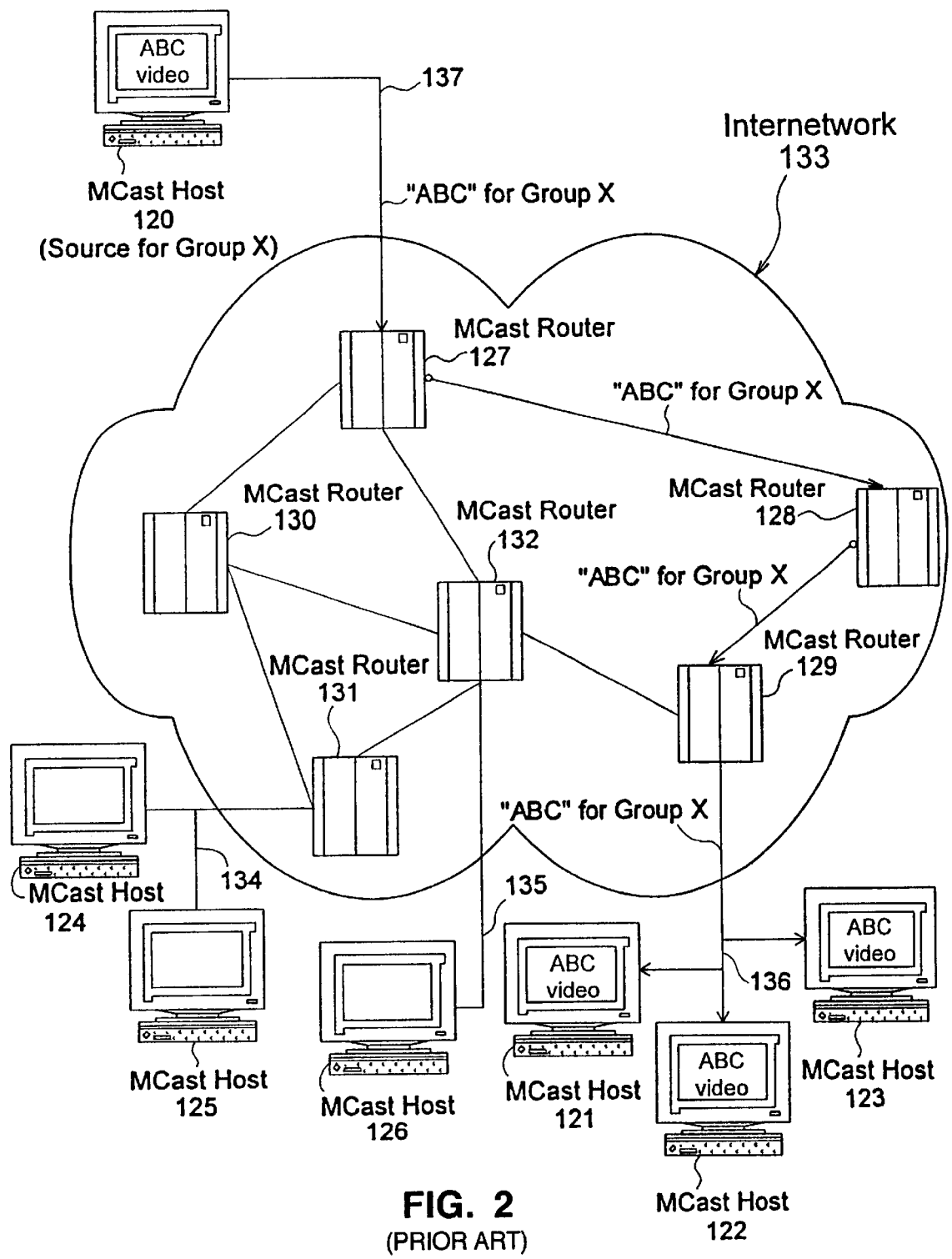
FIG. 2 is an illustration of a prior art router network utilizing multicast communications.

FIG. 2 shows an alternative multicast communications methodology. In multicast communications, one or more senders may transmit information to a group of receivers simultaneously. Each sending host sends a single copy of each packet to a group address. Copies of packets are made only where network paths split or diverge. FIG. 2 shows an example of multicast communications.

In FIG. 2, MCast host 120 executes a multicast-enabled application, and routers 127–132 are multicast-enabled routers. Host 120 is called a "source" or "sender" host since it an originator of multicast packets sent onto the network. In this example, suppose host 120 is transmitting multicast packets of real-time video data containing picture content "ABC" as the multicast "session". The "ABC" packets are multicast onto the network, with each packet containing a destination address corresponding to the multicast group (called Group X in this example). The multicast packets are sent to any hosts on the network which have joined the Multicast Group X session.

Hosts may join groups (begin receiving multicast packets) and leave groups (cease receiving multicast packets) at any time, thus host group membership is dynamic. In FIG. 2, any of hosts 120–126 may join Group X. Multicast-enabled routers 127–132 propagate the multicast packets over the network, with only one copy of each data packet being sent across any one link of the network. Each MCast router 127–132 keeps track of which of its local hosts are joined (e.g.: listening as receiver hosts) to which multicast group sessions and which of its local hosts are sending hosts sending packets to multicast group sessions.

In the example, MCast router 129 has knowledge of local hosts 121–123 which have joined Group X. MCast router 129 only sends a single copy of each multicast packet onto local subnet 136, and does so only if one of its local hosts 121–123 is a member of (i.e.: has joined) Group X. Likewise, MCast router 127 has knowledge of its local sending host 120 sending packets to Multicast Group X. If another host, for example MCast host 125 on subnet 134 joins Multicast Group X (e.g.: becomes a listener), then a routing path within the MCast routers 127–132 is created for the Group X multicast packets which are being sent from sender host 120 so that MCast router 131 receives the multicast packets and routes them to subnet 134, for reception by host 125. Similarly, if MCast host 126 on subnet 135 joins the multicast Group X.

Advantages of multicasting over unicasting are clear from FIG. 2, when compared to FIG. 1. Less overall network traffic exists. Multicast packets are not duplicated in the network until a split in the stream of packets is needed to deliver packets to specific host receivers at seperate routers. Multicast offers cost savings in network resources and allows more receiving hosts to "join" to a group since network processing and bandwidth are conserved. Sender host processing is also conserved since there is no need to support many sequential or concurrent unicast sessions.

Overview of Packet Formats

Figure 3A:
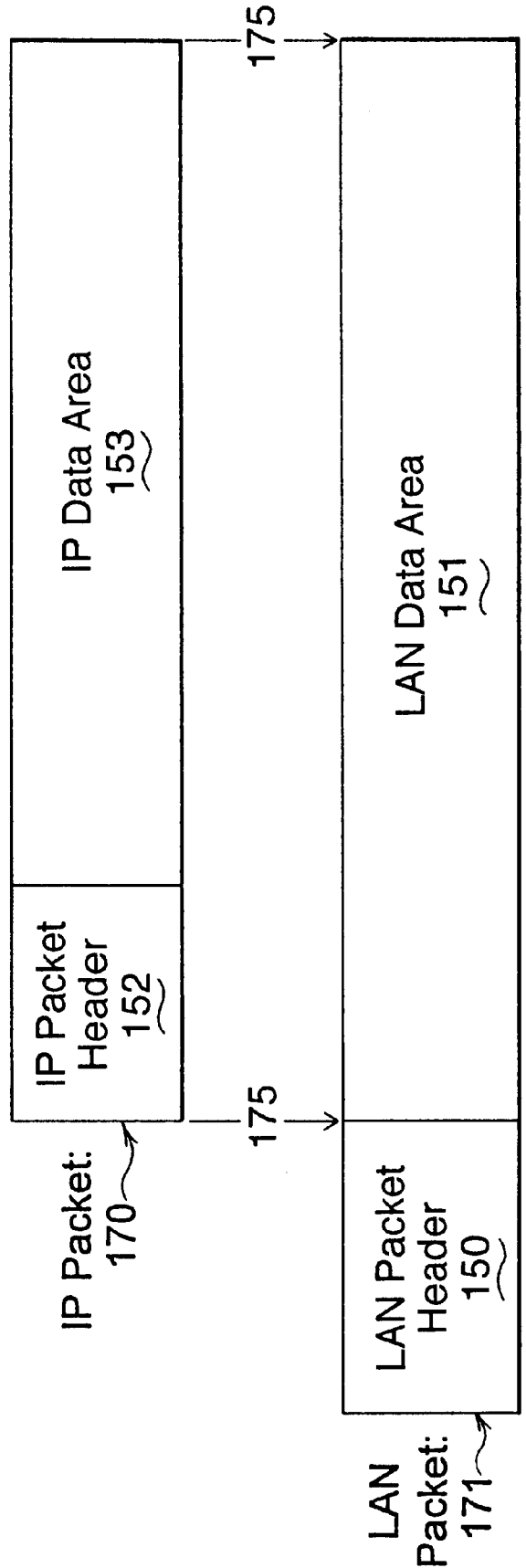
FIG. 3A shows the relationship between LAN packets and IP packets.

A packet sent from a host onto the computer network is actually a collection of binary digits ( 1's and 0's) arranged in a specific order. As shown in FIG. 3A, there are different levels or types of packets sent across networks. At the lowest (physical) level, called the Local Area Network (LAN) level, are LAN packets as indicated at 171. A LAN packet is used to send data between the electrical hardware interfaces of two network devices (hosts or routers) located on a single communications link. A LAN packet has a LAN header 150 and a LAN data area 151. At a higher (network) level, IP packets, as indicated at 170 and by arrows 175, are encapsulated in the LAN data area 151; the IP packet includes IP header 152 and IP data 153, which are used by higher level protocols and applications.

Figure 3B:
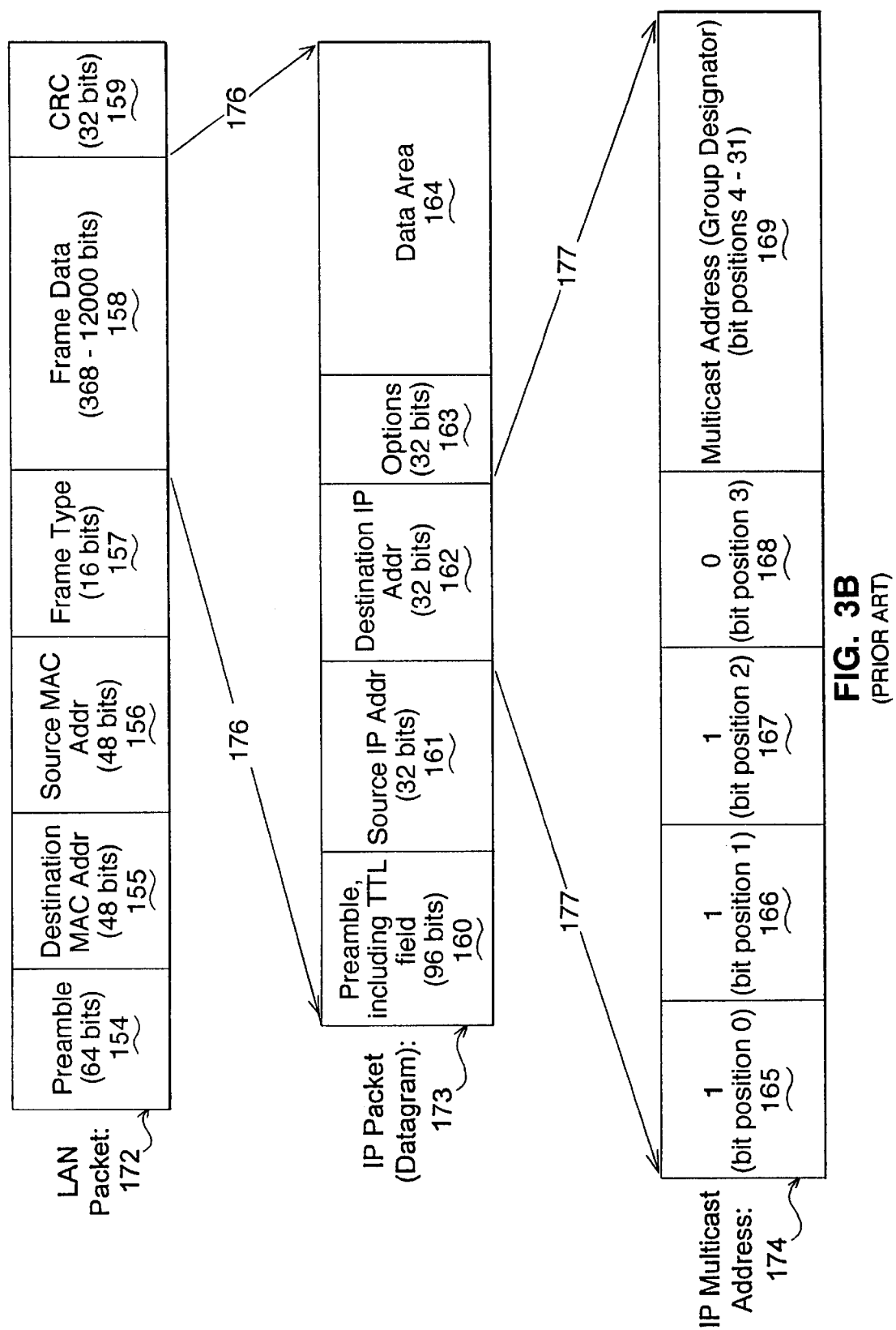
FIG. 3B shows a more detailed relationship between LAN packets and IP packets.

FIG. 3B shows details of the LAN and IP packet structure and their inter-relationship. LAN packet 172 contains four header fields 154–157, a frame data field 158, and a CRC error checking field 159. Destination and Source Medium Access Control (MAC) address fields 155–156 specify which network device attached to the physical network medium is the destination and source of the LAN packet 172, resepectively. A MAC address for any computer data communications device is unique and is assigned by the IEEE. LAN packets are used to transmit the Frame Data 158 field bits (i.e.:the IP packet information) across one link of a computer network, between any two directly connected network devices (routers or hosts) attached to a network. Thus, a LAN packet only makes one "hop" on a link in the network. Upon reception of a LAN packet, the network device strips away the LAN header and trailer fields and passes the Frame Data field bits 158 (i.e.: the encapsulated IP packet 173) up to a "higher level" as indicated by arrows 176 communications protocol where routing is determined based upon the IP header fields 161 and 162 which indicate the source and destination of the IP packet. The Data Area field 164 contains the actual information (i.e.: the video data) that is being transferred between the software applications running on the sending and receiving hosts.

When a IP multicast packet is transmitted onto internetwork 133 in FIG. 2 from a multicasting software application, as from host 120 for example, the IP multicast packet is placed into the data field 151 of a LAN packet 171. The LAN packet is then sent from the sending host 120's network interface, onto the physical network medium, and is received by the computer network interface of the MCast router 127. Upon reception of the LAN packet at the router's interface, the LAN packet information is stripped away, and the IP multicast packet information is examined to determine where the packet gets routed to next.

As previously described, a multicast IP packet does not contain an IP destination host address, but rather contains a destination IP address of a multicast group. All IP multicast packets use Class D IP addresses. In FIG. 3B, IP Multicast Address 174 (packet fields 165–169) corresponds to the Destination IP Address field 162 of IP packet 173, as shown by arrows 177. All IP Multicast addresses have "1110" as their high-order four bits (IP Multicast Address fields 165–168). This convention identifies an IP packet for a multicast group. Class D IP Multicast addresses can range from 224.0.0.0 to 239.255.255.255. Within this range, certain addresses and sub-ranges are reserved for specific multicast uses or dedicated groups. The sub-range of addresses between 224.0.0.0 and 224.0.0.255 is reserved for multicast routing protocols and other uses. Address 224.0.0.1 is an "all hosts group" address, used to address all IP multicast hosts on a directly connected network, and 224.0.0.2 addresses all routers on a Local Area Network (LAN). Dedicated groups exist as well, such as "NetNews" (224.0.13.255). A dedicated group is used much like a radio or television station. Any Multicast enabled application that wants to "listen" to the news (Group NetNews), can join the group having the address of NetNews and begin receiving the IP Multicast NetNews packets. Protocols exist called "Session Announcement Protocol" and "Session Description Protocol" which allow multicast-enabled host applications to determine what groups have active senders at any point in time.

Sending multicast packets from any multicast-enabled host is relatively simple. In FIG. 2, host 120 places the video data "ABC" into a IP multicast packet which specifies an appropriate multicast group destination address (Group X in this example), and then transmits the packet. As the IP packet moves along from host 120, to router 127, then to router 128, and to router 129, and finally to subnet 136, it is placed into and stripped out of LAN packet frames which surround the IP packets transmission over each network "hop".

Spanning Tree For Router Network

Figure 4:
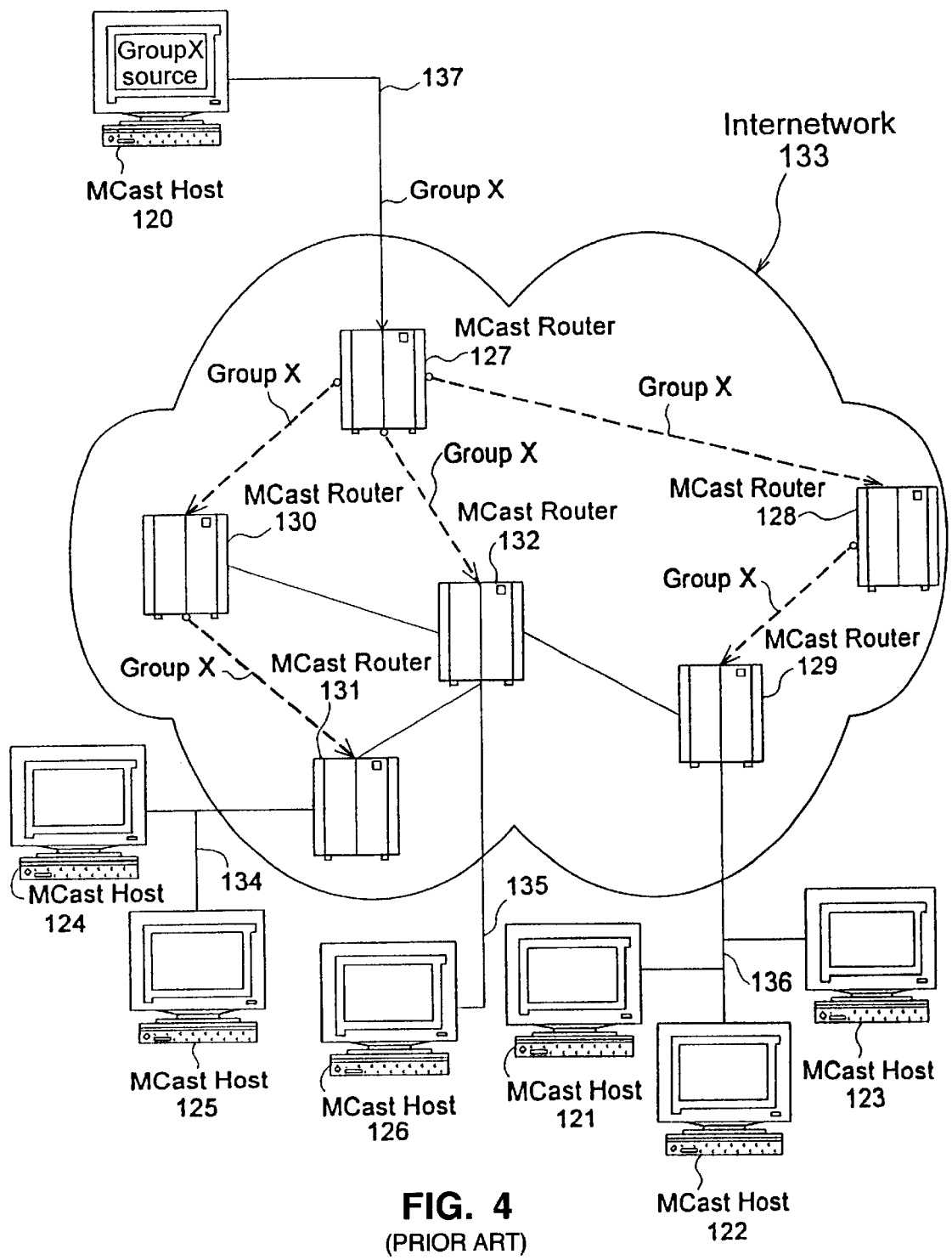
FIG. 4 is an illustration of a prior art router network showing a spanning tree distribution of multicast packets within the network.

One method of routing multicast packets between routers is referred to as a spanning tree method. A spanning tree defines a tree structure where only one active path connects any two routers on the network. FIG. 4 shows the spanning tree, for example multicast group X as dashed lines. Once a spanning tree for a multicast group has been built, a multicast router simply forwards each multicast packet to all interfaces that are part of the spanning tree, except the one on which the multicast packet originally arrived at. Using a spanning tree guarantees that a multicast packet will not loop within the network. Protocols which implement spanning trees are known in the networking community. However, a problem with the spanning tree solution is that it centralizes traffic on a small number of links and may not provide the most efficient path between a source and receiver.

Switched Network With Controlled Multicast Traffic

A particular embodiment of the present invention will now be described with reference to a switch-based network connecting multiple IP subnets. In this embodiment, the switches utilize hardware (i.e., an ASIC) for fast switching of data packets based upon destination MAC address, after an initial connection set-up period which creates the necessary connection table entries in each switch on the path. These switches will implement IP flow switching of multicast packets, i.e., network or layer 3 switching, in that the IP group multicast addresses will map algorithmically to group MAC addresses.

Although the switches described in this particular embodiment are packet switches, the invention is also applicable to the distribution of multicast packets and point-to-multipoint connections over media such as an ATM cell-switched fabric. In either case, for efficient multicast packet distribution, the switch cloud is implemented as a tree rooted at the sender, providing point-to-multipoint switched connections so that only a subset of switches receive the multicast traffic.

The switches do not act as multicast routers, neither individually nor collectively—they do not exchange multicast routing protocol messages. Rather, they detect multicast routers on their access ports to thereby enable hosts in the switch domain to both send and receive multicast traffic beyond the switch domain. Within the switch domain, a new "signal out and connect back" interswitch messaging protocol is implemented for establishing connections through the switch domain for multicast traffic.

To receive multicast traffic, a host in the switch domain must join a multicast group either dynamically (e.g., through the IGMP protocol), or statically by configuration. A host may join a group by sending a membership report to the IP group address in response to an IGMP query from its local switch. Some IP group addresses are reserved for well-known groups. Any host, whether or not a member of the group, may send to a group.

A separate point-to-multipoint connection (i.e., path through the switch network) is set up for each sender and group address pair. When a new source (which may not belong to the group) begins to send, the group-source information is signaled in a multicast switch protocol message along an "all switches" signaling channel which follows a spanning tree. Each switch that has local receivers (hosts) for this group, then unicasts a connection set-up message back toward the sender (source switch) on a predetermined path; this path is a predetermined optimal path for the specific receiver switch and source switch pair. These connection paths are merged at common (trunk) switches. Because the connection paths are generated in the inverse direction (i.e., with respect to the actual multicast traffic), each switch with receivers is referred to as a "call-originating" switch. This mechanism avoids loops and enables multicast transmission similar to unicast transmissions.

This mechanism of "signal out and connect back" works equally well for dense or sparse groups. Note that the packet distribution tree (the point-to-multipoint connection that gets programmed through the switches on the path) is a second tree, independent of the spanning tree used for the multicast switch protocol messaging. Also note that the package distribution tree can add branches when new receivers join, without changing the rest of the tree. This stability is useful in supporting RSVP, which expects to periodically refresh reservations up the same branch that the original path messages went down on.

As previously discussed, prior known multicast routers use a "flood and prune" mechanism known as RPM (reverse path multicasting) to build trees. RPM is used with both DVMRP (Distance Vector Multicast Routing Protocol) and PIM-DM (Protocol-Independent Multicast-Dense Mode) multicast routing protocols. Each node must distinguish the "upstream" link using a routing database, where "upstream" means towards the packet source network. A router will only forward packets that arrive on the upstream link. This "reverse path forwarding" check prevents any loops from forming.

In contrast, the switch domain of the present embodiment performs an inverted tree formation based on a leaf-initiated connection setup. This difference in tree formation is particularly beneficial in that it allows host mobility in the switch domain. In the present invention, "upstream" does not imply a network routing hierarchy, but rather the switch port on, for example, the shortest path first calculation of the Link State Protocol (LSP). This LSP shortest path is precalculated and is already used for unicast path determination in the switches. As a result, the switches require less state information (less memory) to support tree set-up, than do routers. Note, for switches that do not have LSP, a backup flood style mechanism can be employed to accumulate the upstream path.

SFPS Switching

The present embodiment may be implemented as part of the Secure Fast Packet Switching (SFPS) network architecture available from Cabletron Systems, Inc., Rochester, N.H., USA. This architecture is described in the product literature and in U.S. Pat. No. 5,485,455, which issued Dec. 16, 1996, to Kurt Dobbins et al., and is hereby incorporated by reference in its entirety; it is also described in the corresponding PCT application published as WO 95/20850 on Aug. 3, 1995.

Secure Fast Packet Switching (SFPS) technology provides the same or better reliability and security as routers, but with much greater performance and without an increase in cost. Switches avoid the complexities and costs of providing multi-protocol routers. Also, switching systems provides capabilities which routers do not, such as the ability to guarantee a quality of service (QOS) by providing dedicated switched paths through the network.

Switching in SFPS networks is based on physical layer addresses—the source and destination MAC addresses. End-to-end connections are determined by a network management application that provides security and best path routing determinations based on a number of constraints.

As will be described in more detail, switching uses source and destination MAC addresses which alone, or in combination with an input port on a switch, form a unique "connection identifier" for any communication exchange between designated end systems. As an example:

input port=2
source MAC address=00:00:1 D: 01:02:03
destination MAC address=00:00:1 D: 11:22:33 together form a "tuple" bound to a specific uni-directional flow from a source address to a destination address. All packets that have this tuple are automatically switched i.e., (in a hardware) according to the operation of the switch.

In traditional router devices discussed above, each packet is treated as an independent unit of data which is individually processed at each router to obtain path determination. In contrast, with SFPS switching, this processing is done only with initial packets sent between the host sender and host receiver. Initial packets are decoded, and through use of a central or distributed directory of end system (host) constraints policy, call attributes, location, paths, quality of service, etc., the connection is either rejected or accepted. If accepted, the path is determined and setup. At that point, switches along the path are "programmed" to allow subsequent packets on this specific "connection" to be quickly switched (i.e., in hardware—ASIC). In either case, subsequent packets are either switched or discarded without having to reapply all of the security and access control and routing path determination logic.

The above switching network is referred to as a "flat network", since packets remain unchanged throughout their propagation across the switching network. This switching technology may be constructed as either software objects which exist in embedded devices as firmware, as software objects which are part of an application on a commercial computer system, or as application specific integrated circuits (ASIC), or functionally equivalent hardware components. Generally, a switch is a self-contained piece of hardware having multiple ports to which network cables connect, and includes software and a processor for executing the same.

Figure 5:
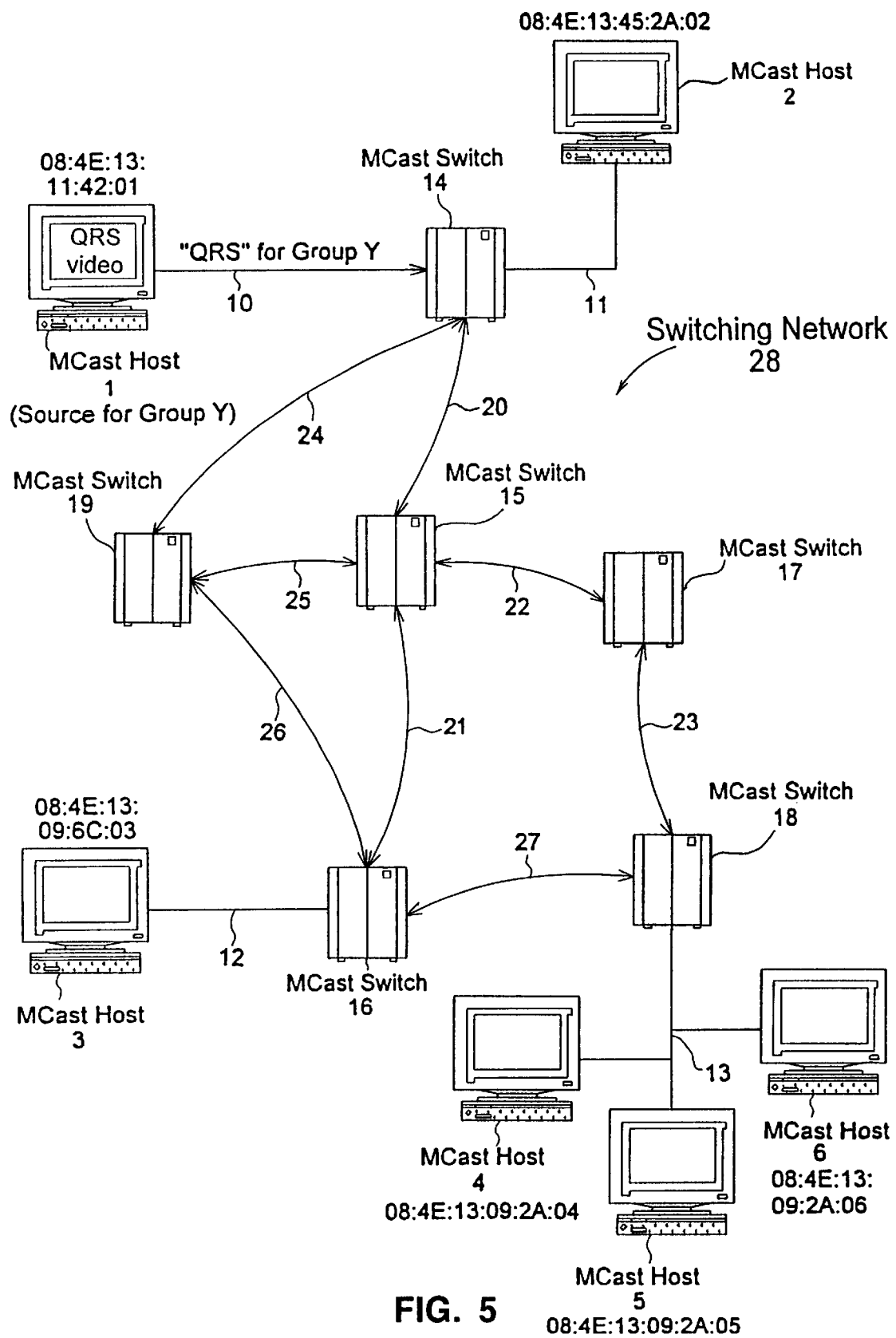
FIG. 5 is an illustration of a switching network utilizing multicast switches and performing multicast communications according to various embodiments of the invention.

In FIG. 5, a switching network 28 is shown comprising multicast-enabled (MCast) switches 14–19 inter-connected with network links 20–27. The network links 20–27 connect to network ports on each switch. Access or host links 10–13 allow the multicast-enabled (MCast) hosts 1–6 to connect to their respective local MCast switches 14, 16 or 18. MCast switches 14–19 switch packets transmitted between sending and receiving hosts 1–6. Other hosts may be attached to switches 14–19, but are not shown for brevity.

The data communications medium of host links 10–13 and network links 20–27 may be any type which supports packet data communications. Each host 1–6 has a unique network address. In this example Ethernet addressing is used. The scope of the invention is not limited to specific types of addressing or data communications medium. Other types of network communications and addressing may be used, such as Asynchronous Transfer Mode (ATM), Integrated Services Digital Networks (ISDN), Fiber Distributed Data Interface (FDDI), Token-Ring networking, Systems Network Architecture (SNA), or Appletalk networking schemes, for example.

Figure 6:
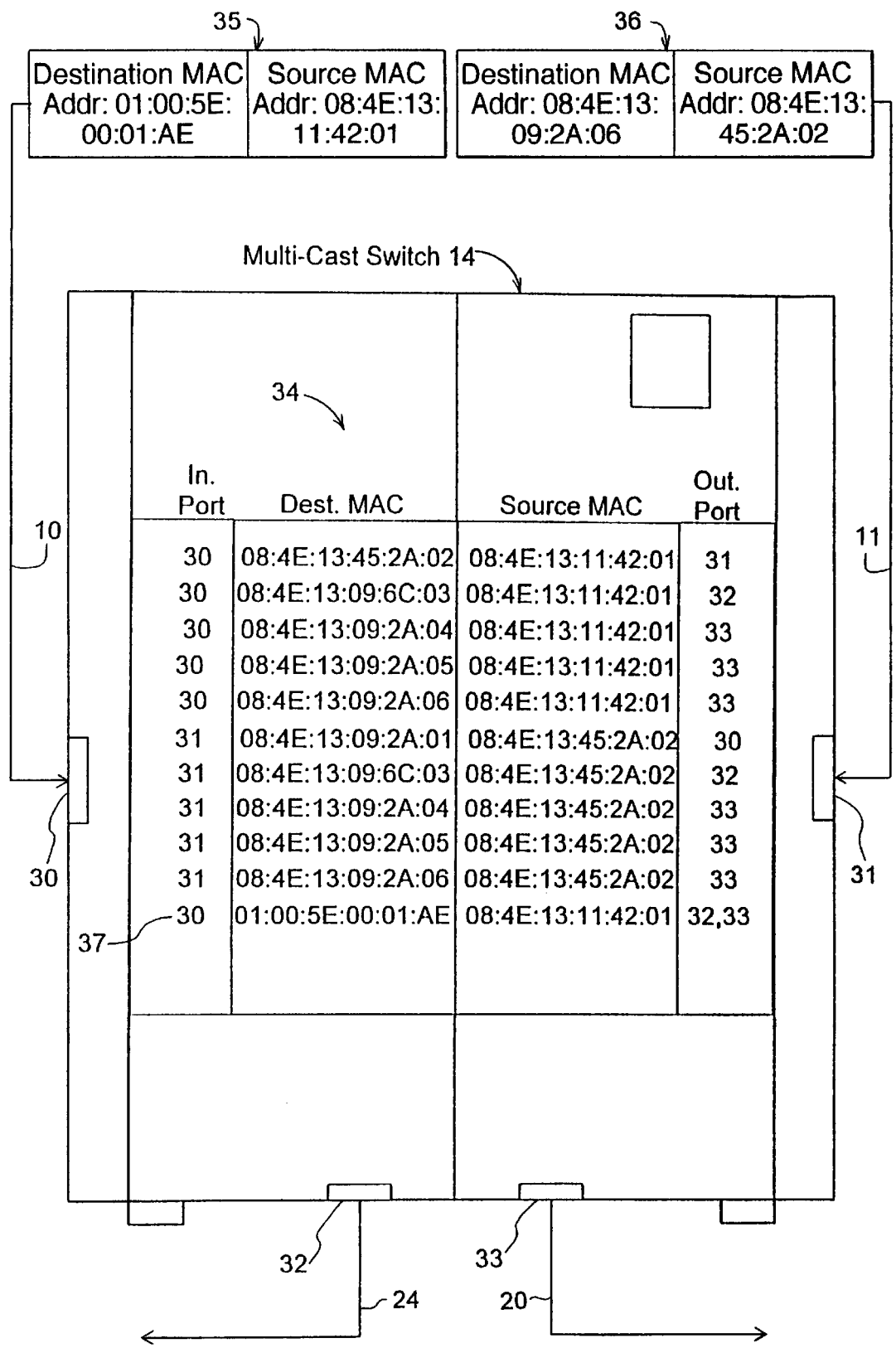
FIG. 6 is a detailed illustration of a multicast switch including a connection table according to various embodiments of the invention.

A specific example of packet switching according to one embodiment of the present invention now be given. FIG. 6 shows MCast switch 14 from FIG. 5 in more detail. Packets are transmitted to and from switch 14 over network links 20 and 24 (connected to network ports 33 and 32 ) and over host links 10 and 11 (connected to host ports 30 and 31). Connection table 34 maintains currently active connections in memory during switch operation. Each connection is equivalent to one entry (row of values) in the table, including a "tuple" and its associated Out Port(s). The "In Port" column of connection table 34 designates input ports (network or host) on which packets arrive. The "Dest. MAC" and "Source MAC" columns refer to the destination and source MAC addresses for packets being switched. The first three columns (In Port, Dest. MAC and Source MAC) of a connection form a connection tuple. The "Out Port" column lists the output port(s) (network or host) to which packets are switched to when a packet tuple matches a connection tuple in the connection table. When a packet arrives at switch 14 on any link (network or host), the packet's tuple is looked up in the connection table 34, and the packet is switched to the designated output port(s).

In FIG. 6, suppose LAN packets 35 and 36 (shown with only their destination and source MAC address fields visible for purposes of this explanation) arrive at multicast switch 14 on host ports 30 and 31, respectively. LAN packet 36 is a unicast packet, since both its source and destination MAC addresses correspond to host addresses (hosts 1 and 6, respectively) from FIG. 5. The connection table 34 indicates that the tuple for LAN packet 36 (In Port=31, Dest. MAC= 08:4E:13:09:2A:06, Source MAC=08:4E:13:45:2A:02), the packet will be switched to network output port 33.

The last connection in connection table 34, labeled 37, corresponds to a multicast group connection and designates multiple out ports. LAN packet 35 is a multicast packet, since its destination MAC address is an group address (beginning with 01:00) which does not correspond to any host on network 28. When multicast packet 35 arrives at switch 14, based on its tuple value, it will be switched to out ports 32 and 33.

Components of the Multicast Solution

Multicast is a fundamental networking paradigm and requires additional mechanisms beyond what is present for unicast connection. New components include: the provision of a reliable signaling channel to announce information to other switches; additional protocol for point-to-multipoint connection set up; an IGMP (Internet Group Management Protocol) state machine to learn when hosts want to join multicast groups; the handling of attached multicast routers; distribution of group membership information; and methods for setting up and tearing down multicast packet distribution trees.

Reliable Delivery

Multicast switch protocol (SP) messages are sent over a transport layer called "reliable delivery." When reliable delivery is called by an application layer to send a message payload out one or more ports, it allocates a packet buffer, initializes it with a MAC header, SP header, and Reliable Delivery header, then copies in the application payload. It assigns a unique identifier to the message, which embeds that switch's primary MAC address, and sets this identifier into the Reliable Delivery header.

Reliable delivery sets a timer (on each outport the packet is sent) and waits for acknowledgments from neighbors. An acknowledgment shuts off that port's timer. If a timer expires it resends the message on that port and resets that timer, repeating this every five seconds for up to six retries. It releases the packet buffer after all acknowledgments have been received or failing that, after one minute.

If reliable delivery receives a message it did not originate, it sends an acknowledgment and delivers the message payload to the given application layer. If it receives a message it did originate, i.e. a "known" message, it does not pass the message up to the application layer but treats it as an acknowledgment instead. Any further copies of the known message are disregarded. Therefore, loops are immediately damped and reliable delivery can be used to flood signal messages to all switches.

Reliable delivery provides three interfaces to the application layer to send messages:
(1) Deliver—sends a message one hop to neighbor switches,
(2) Announce—sends to all switches, either on the 802.1d spanning tree or by flood,
(3) Direct—sends along a path to a target switch and only passes the message up to the application layer in the target switch.

Multicast Signal Channel

Messages announced through reliable delivery use the 802.1d spanning tree. Currently the spanning tree is kept only as a database and packets are forwarded through host code in each switch.

In this embodiment, implementing the signal channel in the switch requires only a single connection entry. All links in the spanning tree for that switch are in the outport mask along with the host control port. The hardware source port checking is disabled so that the switch forwards a packet to all links in the outport mask except the link on which the packet arrived. In the multicast signal channel, packets are forwarded strictly along the spanning tree, but it would be possible during a topology change for a packet to arrive on a link not on the spanning tree and cause a loop. To prevent looping the source port is checked in host code to validate arrival on the upstream spanning tree link, and if not validated, the connection entry is removed and the packet dropped. A snooping mechanism may be implemented to learn the upstream spanning tree link for each remote switch.

Multicast Router Detection and Handling

On any given switch access port there may be one or more multiple multicast-capable routers. These routers may be upstream or downstream at any time with respect to any given multicast packet distribution. Downstream multicast routers must be detected in order to forward multicast packets to them; upstream multicast routers must be detected to receive multicast packets from them. Detection is done by passive snooping.

It is easy to detect the presence of active attached multicast routers. For DVMRP-capable multicast routers, the presence of the router on an access port is detected be receiving a Neighbor Probe Messages sent to the "All-DVMRP-Routers" group address. For PIM-capable multicast routers, their presence is detected by receiving PIM Router-Query messages on the "All-PIM-Routers" (224.0.0.13) group address.

A router is supported as if it were an attached host which had joined all multicast groups. Even though the switch does not issue IGMP queries on the router link, and even though multicast routers do not send out IGMP membership reports to join the "All-DVMRP-Routers" or "All-PIM-Routers" groups, these routers hear each other on these groups because routers are implicitly joined to all multicast groups. In other words the switch fabric looks to attached routers as if it were a shared media wire.

Therefore it is not necessary for a switch to be recognized as a "neighbor" by a multicast router. On behalf of hosts anywhere in the domain, a switch (1) sends out multicast packets onto router links and (2) receives in multicast packets from routers because IGMP reports are sent on router ports to join groups on behalf of those domain hosts. Any multicast generated from within the switch domain is sent to all attached multicast routers and any multicast packets sent into the domain from a router will transmit to other multicast routers as well as any directly-attached hosts which had already joined that group.

Multicast Switch Protocol

The signaling protocol used for multicast consists of Switch Protocol (SP) messages based on the "81 FD" ethertype. SP messages are sent by and to other switches and only through reliable delivery. Some messages are announced to all switches simultaneously, and some messages are delivered one hop to neighbors or directed to a given neighbor switch.

Message types are:

Router Present, announced to say detection of a multicast router attached;

Groups Present, directed to router-attached switch to inform of locally joined groups;

Senders Present, announced when new multicast sender appears on an access port, or directed with list of senders in response to a Switch Join;

Switch Join, announced when a multicast group initially joins a switch;

Switch Leave, announced when a group leaves the switch;

Map, delivered to neighbors along a path to set up a connection;

Unmap, delivered up the inport or down the outports of a connection to tear it down;

Assert, delivered to neighbors when there is contention to send on a shared link.

IGMP State Machine

A switch runs a separate IGMP state machine on each of its access ports. For ATM, this may mean on each virtual access port, representing an SVC or LANE emulated LAN. The state machine sends IGMP membership queries periodically out each port, and listens for IGMP membership reports (called "joins") to maintain a database of local receivers per port. This database is held in a table and allows ports to be joined statically as well. It a timer expires without any reports, the switch knows there are no receivers for that group and can stop forwarding multicast flows out that port.

IGMP Active Senders Problem

The IGMP membership report, sent in response to a query, is addressed to the group multicast address. Suppose a given host reports and that host is also a sender to the group and therefore the source of a connection to other receivers in the domain. In this case the membership report is forwarded out all those receivers' ports and hearing this report causes other hosts to reset their timers instead of responding to the local queries on their links. Switches would not know if receivers were still there. Delaying queries on those access ports having active senders would reduce the problem but not solve it. A switch must either: (1) temporarily take down connections and throttle multicast flows to check for membership; or (2) assume membership remains and send out flows that are no longer wanted.

One way to avoid this problem is to have the IP protocol field distinguish IGMP packets, as part of its flow identifier connection key. Then, a source can recognize its own packets.

Another solution takes down connections by "sniffing" each access port for the duration of a "query interval" of about 10 seconds. Sniffing walks the multicast connection table and, for any connection having that inport, substitutes the host control port for the outport(s), before sending out an IGMP query on the port. Existing sender flows arriving on the sniffed port are forwarded through the CPU (central processing unit on the switch) rather than switched in hardware. If a new sender appears on a sniffed port the Senders' Present announcement is made to all other switches and the senders's multicast packets are forwarded by the CPU. Should membership to a given group be reported on the sniffed port, sniffed connections for that group are immediately restored to their original outports. Finally, when the query interval expires, the port is "unsniffed" and all sniffed connections are restored.

If a multicast router exists there is a contention as to whether the router or the switch is the designated querier. IGMP specifies that the lowest IP address wins. If hosts also exist on this port which may respond to queries from the router, the switch must not allow host membership reports to be switched through it—this would silence other receivers of that group from responding to local queries on their access ports. The problem could be avoided by a topology restriction—no multicast senders allowed on links with multicast routers—enforced by the switch accepting only PIM or DVMRP group packets in on such a link.

However, another solution is not to restrict topology. If the switch hears an active router it defers querying to the router; when a switch hears the query from a router it sniffs that port. This mechanism would appear to leave a window whereby a membership report could slip through before a congested switch hears the query. This is generally not a problem in practice because IGMP specifies host membership reports are delayed at least 1 second and multiple queries must go unanswered before group membership is lost on a port. A port can also be configured to not query by setting the query interval in the MIB for the IGMP Cache Table to zero.

Multicast Database Service

Multicast maintains two distributed databases readable through SNMP (Simple Network Management Protocol). Each switch keeps a database of senders in a multicast connection table, each active local sender being represented with at least a filter connection, and each switch also keeps a database of local receiver ports in a table. Senders are discovered when they send and are removed through age out. IP receivers are either configured statically or maintained through the dynamic IGMP query protocol. This database does not require replication nor highly dynamic refresh because the initial appearance of both senders and receivers is reliably announced to all switches, and if the switch resets its senders and receivers reappear and are reannounced.

Of course a switch cannot announce the disappearance of its senders and receivers if it reboots. Because of this and possible topology changes that could occur during physical wire changes or on busy or resetting switches, it is possible to form a hole or loop. Aging mechanisms take care of holes. A switch detects a loop by receiving a multicast flow packet on a port other than the connection inport. Upon detecting such a "mobile sender" the switch would tear down the old connection which fixes the loop. Although these mechanisms clean up bad connections, rerouting around such problems may require that information held locally in the multicast database be distributed again to reset connections. Thus each switch reannounces its database every few minutes.

Local Senders Database

Each switch maintains knowledge of its local senders. This database (see Table 1) is indexed by multicast group and host source address and holds the sources that have appeared on this switch and the inport on which the source host appeared with the create time of the entry. This information is periodically reannounced in a Senders Present message in case any potential receivers initially failed to connect.

TABLE 1

Local Senders Database

| Group | Source IP | Source MAC | Inport | Created |
|---|---|---|---|---|
| 224.3.3.3 | 134.141.40.3 | 1:2:3:4:5:6 | 2 | 1:15 |

Local Receivers Database

Each switch maintains knowledge of its local receivers. The IGMP query state machine builds in each switch a local database (Table 2) of multicast groups which exist on each interface of that switch. Alternately, group membership may be statically configured. When group membership initially occurs on a switch, this information is distributed to all other switches by sending an SP Switch Join announcement and it is periodically reannounced for all groups joined at that switch in a Groups Present message.

TABLE 2

Multicast Receivers Database

| Group | Port | Receivers Exist? |
|---|---|---|
| 224.3.3.3 | 2 | yes |

Joined Groups Database Actions

Router-attached switches maintain knowledge of all groups in the domain. Groups joined at any switch in the domain must be known to any switch with attached multicast routers to permit joining these groups up to the router. This is done by answering IGMP queries generated by the router with a membership report for each group known in the domain. When a switch first joins a group or leaves a group, it announces this on the signal channel to all switches. Periodically this information is reannounced—the Groups Present message. This is necessary so the switches with attached multicast routers remember this information to continue joining or to stop joining up to the router when the last switch leaves the group.

Connection Set Up

When a source host, which may not even belong to a group, first sends multicast packets to a group address, there is no existing connection at the ingress (local) switch and the first packet is "call processed." The switch installs either a filter connection, to keep following packets from clogging its host control port, or installs a connection out its access port(s) if there are already local receiver port(s) joined to the group. It then announces a Senders Present message on the signal channel. (Note: a Senders Present message may also be sent directly to a switch which later joins the multicast group, in response to the Switch Join announcement.)

This Senders Present message contains the group, the source host, and the source switch identity. Any switch having local receivers for that group attempts to set up a connection to the source host. Such a switch, although it is a call-originating switch, is an egress switch for the connection. To set up the connection it retrieves the precalculated shortest path toward the ingress switch from the LSP database. (A backup alternate mechanism to determine a path, is discussed below under "Sender Fan Out").

The call-originating switch then reliably delivers a Map connection set-up message one hop up the path's upstream link toward the ingress switch. This Map message contains the full path. The receiving switch named as the next hop on the path processes the Map. If it has no connection for that (group, source) it sets one up and forwards the Map up the path. If it already has a connection it simply adds in the outport on which it received the Map message and does not forward the Map. The final result of this process is a point-to-multipoint connection rooted at the source host out to all receiver active links.

Connection Set Up—At An Egress Switch

If a switch detects through IGMP a group joining on a new access port and there are already connections installed to the group, the switch adds that port to these connections. These connections could source from local senders on its other access ports, or remote senders on a network inport.

If a switch hears a Senders Present announcement for a group it has not joined it disregards the message. If it has joined that group it checks to see if it already has the connection set up for that {group/source} key, and if so it assures the connection outports match the ports in the multicast receivers database. If there is no existing connection it sets one. It uses the LSP database to get the inport, which is the link on the path to the sending switch, and gets outports from the multicast receivers database. Then it initiates a connection set up Map message upstream on that path.

Connection Set Up—Along Tree Branch

In the multicast tree being formed, some switches lie along branches and some switches are located at branch points of the tree. First consider a switch which lies along a branch, on a link with only one peer. This is a switch which receives a Map message in which it is the next switch along the path in the message and which does not already have an existing connection installed with this {group/source} key. The switch installs a new connection for its point of the path, with the inport being its upstream path link and the outport being the port on which the set-up message was received. It then forwards the Map up the path toward the next switch.

Connection Set Up—At Tree Branch Point

A switch that will be at a branch point in the multicast tree being formed receives a Map message in which it is next on the path and it already has a connection installed with this {group/source} key. First it validates the message arrival port—there would be a "mobile sender" or a topology error condition if the Map arrival port were the inport of the pre-existing connection. If there is no error, the message arrival port is added to the outports in this existing connection and the set-up process terminates. There is however special handling if a switch receives the message on a link on which it has multiple peers.

Connection Set Up—Filtering On Multi-Switch Links

A switch which receives the Map message but is not included on the path in the message, and does not have the requested connection already installed, installs a filter connection. This is important for switches on multi-switch links (such as FDDI loops) since uninvolved switches (i.e., switches not included in the tree being set up) are protected from congestion before the multicast flow begins. This is one reason the set-up message is broadcast hop-by-hop upstream, rather than simply unicast to the next peer switch on the path.

Connection Set Up—Designated Sender on Multi-switch Links

When more than two switches exist on the same link, whether an FDDI or ethernet link, a mechanism is necessary to prevent sending duplicate packets downstream. This problem is rare, but could occur when receivers, connecting up toward a given multicast source ask for LSP paths at different times, and the LSP paths returned name different switches as sender on a shared link. A similar problem would exist if different redundant links between the same switch pair were chosen for the connect up paths. A mechanism must assure that only one switch forwards on to the common link for a given tree.

This problem also occurs in the legacy world among multicast routers. To solve it PIM routers exchange PIM "Assert" messages. This exchange determines the lowest IP addressed router on the shared link which is then designated to be the sole multicast sender on that link. Switches require similar protocol; the question is what basis should be used to designate the sole sender. It is arbitrary to choose simply lowest or highest address sender, and protocol would be required anyway among the subset of requested senders. A basis of "closest to the source" is useless; it is unlikely that if two switches on a multi-switch link are picked by LSP, that one is much closer to the source than the other.

One solution is to choose the "first connected" sender switch—which is enabled by maintaining timestamps on connections. A switch having a connection with the common link as an outport considers itself the designated sender on the link. This switch detects a multiple sender condition for that {group/source} key when it receives on that common link, either: (1) a Map request with that key which names not it but another switch as next switch in the path; or (2) a multicast packet having that key; or (3) an Assert message. When the condition is detected, the switch sends an Assert message out the common link in the attempt to be the only designated sender. The Assert contains its switch identity, the {group, source} key, and the connection timestamp. Since different {group, source} trees can have different designated senders, this mechanism distributes the load over multiple switches.

A switch receiving an Assert that considers itself the designated sender for that key does nothing if it has the older connection, i.e. its timestamp is earlier than that in the Assert message. If its connection is younger it cannot remain designated sender. It removes the common link from the outports of that connection; if no outports remain it sends an Unmap up the connection inport as discussed below.

Connection Tear Down

The packet distribution tree of a multicast connection is distributed across switches. Multicast connections form trees rather than simple paths and the loss of a switch or link may affect only a small part of the tree. An individual switch knows only the mapping of inport to outport(s) for each multicast connection it has installed. There are three cases where branches of a multicast tree must be torn down; one occurs due to a topology change; another occurs when a receiver leaves a multicast group; and the third occurs when a sender ages out.

Connection Tear Down—Topology Change

A switch may detect topology changes a number of ways. Physical rewiring could create a loop or cause receipt of a multicast flow packet on a port other than its inport. More typical is the detection of a lost switch or link. A switch discovers local losses through electrical down or switch hello failure. A switch is told of remote losses through signaling initiated by a switch local to the change. This signaling is done via LSP (Link State Protocol) topology exchange, but could be done for multicast by an announcement message on the signal channel. Since multicast connections do not retain associated paths, when a link or switch is lost, switches adjacent to the change control the tear down and rerouting.

An adjacent switch above a bad link removes that link for the outports of any of its multicast connections. Any connection with the lost link as its only outport becomes a filter connection and the switch initiates an Unmap message up to its upstream neighbor, removing the filter when the Unmap is acknowledged. Unmap messages propagate up to the next merge point or to the sender switch.

An adjacent switch below the bad link removes all multicast connections having that link as inport and for each such connection sends an Unmap message down to all neighbor switches. If a switch has local receivers to the group of any affected connection, it attempts to reroute and asks LSP for another path to sender. If that path provides a new inport it initiates a new connection by sending a Map up that path.

A switch sending on to a FDDI ring or other multi-switch common link must know when multiple downstream switches receive over the common link when tearing down connections. This may require another Assert message.

Connection Tear Down—Switch Port Leave

The switch knows when the last receiver to a group on an access port leaves that group, by detecting the lack of IGMP membership reports in response to queries. It removes that port from the outports of any multicast connection for that group. Some of these connections may thereby become filter connections because there are no other outports. Any filter connection with a local sender is immediately removed; if that sender is still active the filter connection would get immediately reinstated as a new sender. For any filter connection with a remote sender, i.e. attached to some other switch, the switch sends an Unmap message up the inport toward its upstream neighbor and removes the filter when the Unmap is acknowledged.

Unmap messages continue to propagate up to a merge point or to the sender switch as follows: each next upstream switch removes the link on which it receives the message from the outports of its connection entry and, if no outports remain, forwards the Unmap up the inport of the connection. Each switch acknowledges receipt and removes its filter connection when acknowledgment is received. Thus, the affected branch of the tree is torn down reliably hop-by-hop until the ingress switch or an upstream merge point is reached.

If the port is also the last port on that switch belonging to that group, the switch announces a Switch Leave on the signal channel. This is so that router attached switches may know when the last switch leaves the group and can stop joining the group to the router.

Connection Tear Down—Sender Age Out

Inactive multicast connections are aged out for example after 10 minutes. Age out is generally necessary because of hardware limitations—only a given number of multicast outport masks are supported in the switch. A switch uses for example a five minute interval timer to age out connections sourced from its locally attached hosts. Before removal a connection is sampled for an interval by adding the host control port to its outports. If a sender is still active that connection is not removed.

If the sender is inactive an Unmap message is sent out each outport of the connection to downstream neighbors and the connection is deleted. Each switch receiving the Unmap removes the connection for the given {group/source} key. The Unmap message propagates down to the egress switches.

Sender Fan Out

Consider a switch domain not running LSP. When a new local multicast source appears and is call processed, the switch sends an SP message to each neighbor until each neighbor acknowledges that message. This message includes a source route field in which it places its outgoing switch link identifier. Each neighbor switch notes the link on which it first hears the message, fans this message out to all neighbors, adding its outgoing switch link identifier. The message thus accumulates a source route as it fans out. A switch receiving this message and which has local receivers to the group can use the source route to define "upstream" and initiate connection set-up.

A mixed environment of LSP and non-LSP switches would require further modification to the connection setup protocol so that non-LSP switches could connect up to the nearest LSP switch which would then add its SPF path to the source route to continue the connection set up toward the source.

Related Applications

In the present embodiment, a single packet distribution tree is set up from a given sender to all receivers in the group defined by a designated IP group address. In networks employing work groups, i.e., a logical (as opposed to physical) domain of hosts at various locations on various subnets, a user may wish to run several instances of an application (such as a whiteboard or video conference), where each instance involves a separate set of hosts in the same domain. Each instance would thus have its own group IP address, associated with the workgroup(s) by configuration. A description of workgroup domains is contained in copending and commonly-owned U.S. Ser. No. 08/501,324 filed Jul. 12, 1995 by K. Dobbins et al., and hereby incorporated by reference in its entirety.

Also, the present embodiment can be integrated with a network utilizing virtual LANs (VLANs), which again are logical groups of hosts on various subnets. A "multicast VLAN" can be configured on a port basis through VLAN management. The VLAN is named according to the associated multicast group IP address, such as IP.224.0.1.2. Ports can be joined to multicast groups statically (without running IGMP) by assignment of the port to the multicast VLAN. Ports on which a group is joined through IGMP are also remembered in that VLAN. A description of VLAN management is contained in copending and commonly owned U.S. Ser. No. 08/559,738 filed Nov. 15, 1995 by K. Dobbins et al., and hereby incorporated by reference in its entirety.

Static configuration is useful in applications such as disk mirroring. For example, consider a set of dispersed servers which replicate a database on their disks. Each server port is configured to the multicast VLAN and joins the group. This allows a client anywhere in the domain to update all servers simultaneously.

Flow Charts

The flow charts shown in FIGS. 7–20 illustrate the prior described message handling in a switching network such as shown in FIG. 5. Generally, each flow chart represents the steps necessary to handle a specific multicasting event or message. After a description of the flow charts, an example multicasting session between various hosts will be described to aid in the understanding of the invention. Various alterations may be made to the processing disclosed herein by those skilled in the art while maintaining the same overall desired effect. These alterations and modifications are meant to be within the scope of the invention.

Figure 7A:
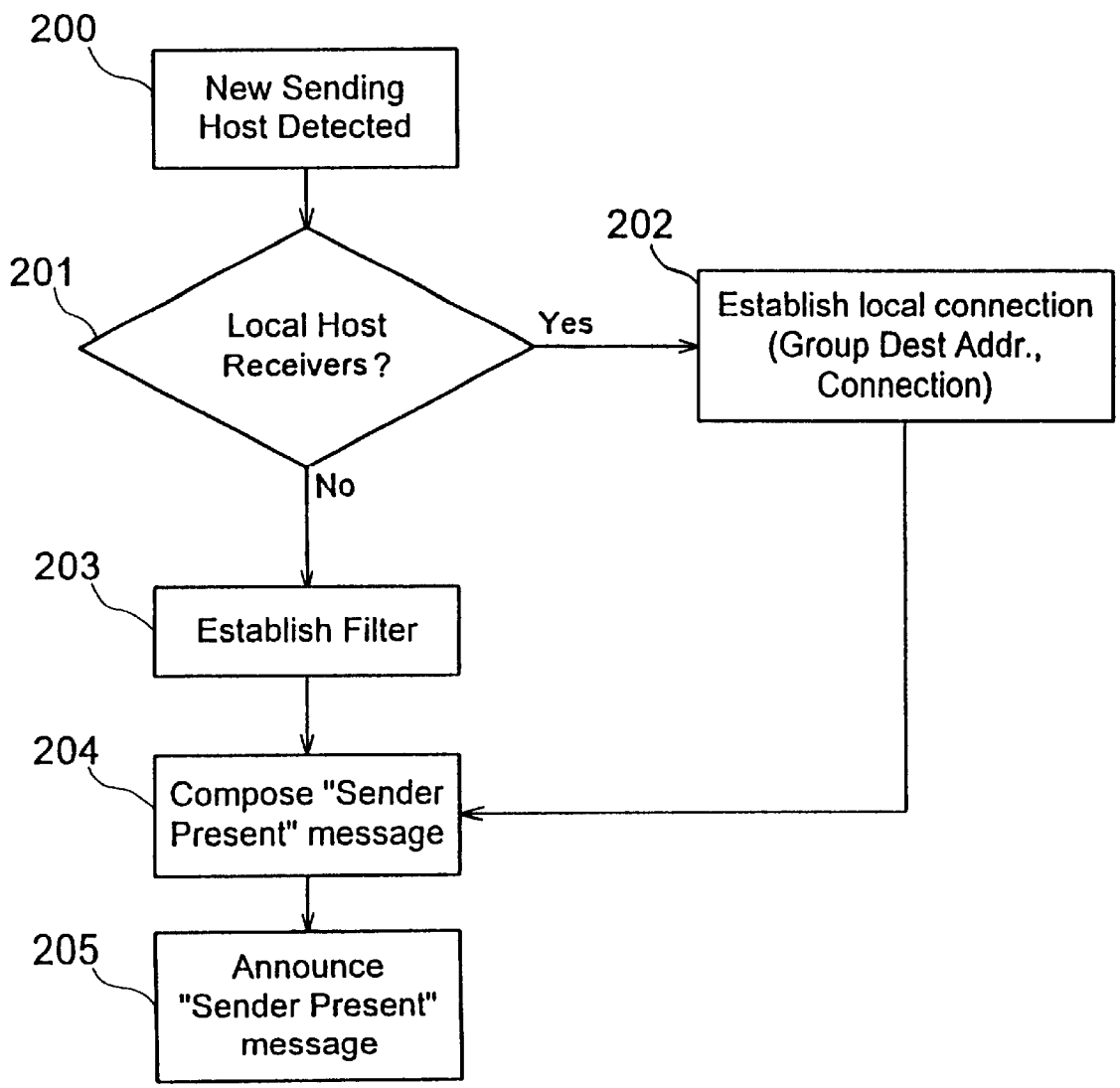
FIG. 7A is a flowchart of one embodiment of the multicasting protocol method of the present invention showing multicast switch processing steps undertaken upon the detection of a local host sending packets to a new multicast group.

FIG. 7A shows the general processing steps a switch performs upon detection of a local host transmitting a new session of multi-cast packets for a new group onto the switching network. The sending host is referred to as a source, and corresponds, for example, to MCast host 1 in FIG. 5. In step 200, the source host's local switch (source switch) detects the packets for the Multicast group. The source switch may, for example, correspond to MCast switch 14 in FIG. 5. The source switch checks (step 201), via IGMP, for any other local host receivers on any other local subnets (i.e., subnet shown as host link 11 in FIG. 5) which may be requesting to join the new multicast group, and establishes a connection in the connection table (step 202) for this multicast group for the requesting local host output ports. If there are no local host receivers, the source switch establishes a filter connection (step 203) to momentarily buffer or discard subsequently transmitted multicast packets from the source host until network connections to receivers may be established. At step 204, the source switch then composes a sender present message indicating the presence of a new sending host to a new multicast group. Alternatively, step 204 may be performed after the establishment of connections for local host receivers in step 202. The source switch then reliably announces the sender present message (step 205) to all other switches on the network by transmitting the sender present message onto each of the switch' network ports. The announcement of the single sender present message in a reliable fashion avoids having to flood the network with multicast packets.

Figure 7B:
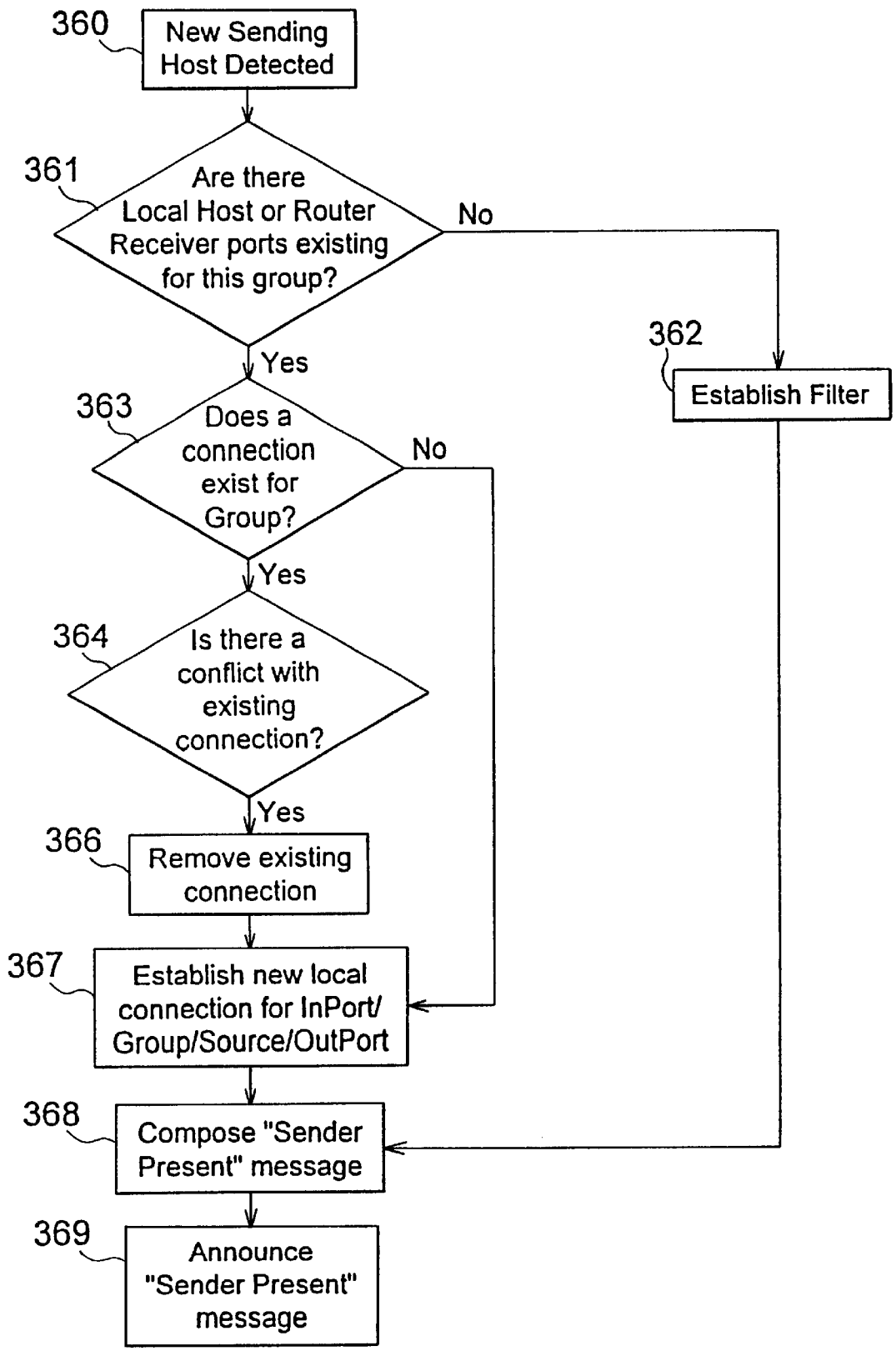
FIG. 7B is a flowchart of another embodiment of the multicasting protocol method of the present invention showing multicast switch processing steps undertaken upon the detection of a local host sending packets to a new multicast group.

FIG. 7B shows an alternative processing embodiment similar to that of FIG. 7A, but handling a case where a router is attached via a communications link to the local switch. The new source host sending to the new multicast group is detected (step 360) and then the local switch determines if there are local hosts or routers which are established or waiting as receivers for the multicast group packets (step 361). If a router neighbors the switch, there may be hosts on the router network which may request to receive (i.e.:join) the new multicast group. IGMP may be used to set up a proxy multicast link between a router and neighboring switch. If the switch determines that a router or local host is requesting to receive the multicast packets from the new local source host, the switch's determines if a connection for this group already exists in the switch' connection table (step 363). If a connection does not exist, one is established (step 367) which contains the multicast group address, the source host addresses, the input port from the source host, and the output port for the requesting local host or router.

However, if a connection does exist for the multicast group (step 363) the switch determines if there is a conflict with the existing connection (step 364). A conflict may occur if an already existing connection for the multicast group/source pair does not list the proper input port for the group/source pair. This may occur if the source host has moved to a different port on the local switch. If a conflict is apparent, the existing connection is removed (step 366) from the connection table and a new connection is established (step 367) containing the proper entries for the new group and source host addresses, and the output port of the local host or router requesting to join the new group. After all of these steps, a "sender present" message is composed (step 368) as in FIG. 7A and is then announced onto the switching network (step 369).

The steps in FIG. 7B provide a more robust multicasting scheme which allows source hosts to move and provides for appropriate connection updating capability. This embodiment also provides for the ability to use IGMP to allow router networks to join into multicasting sessions originating from a switch network.

Figure 8:
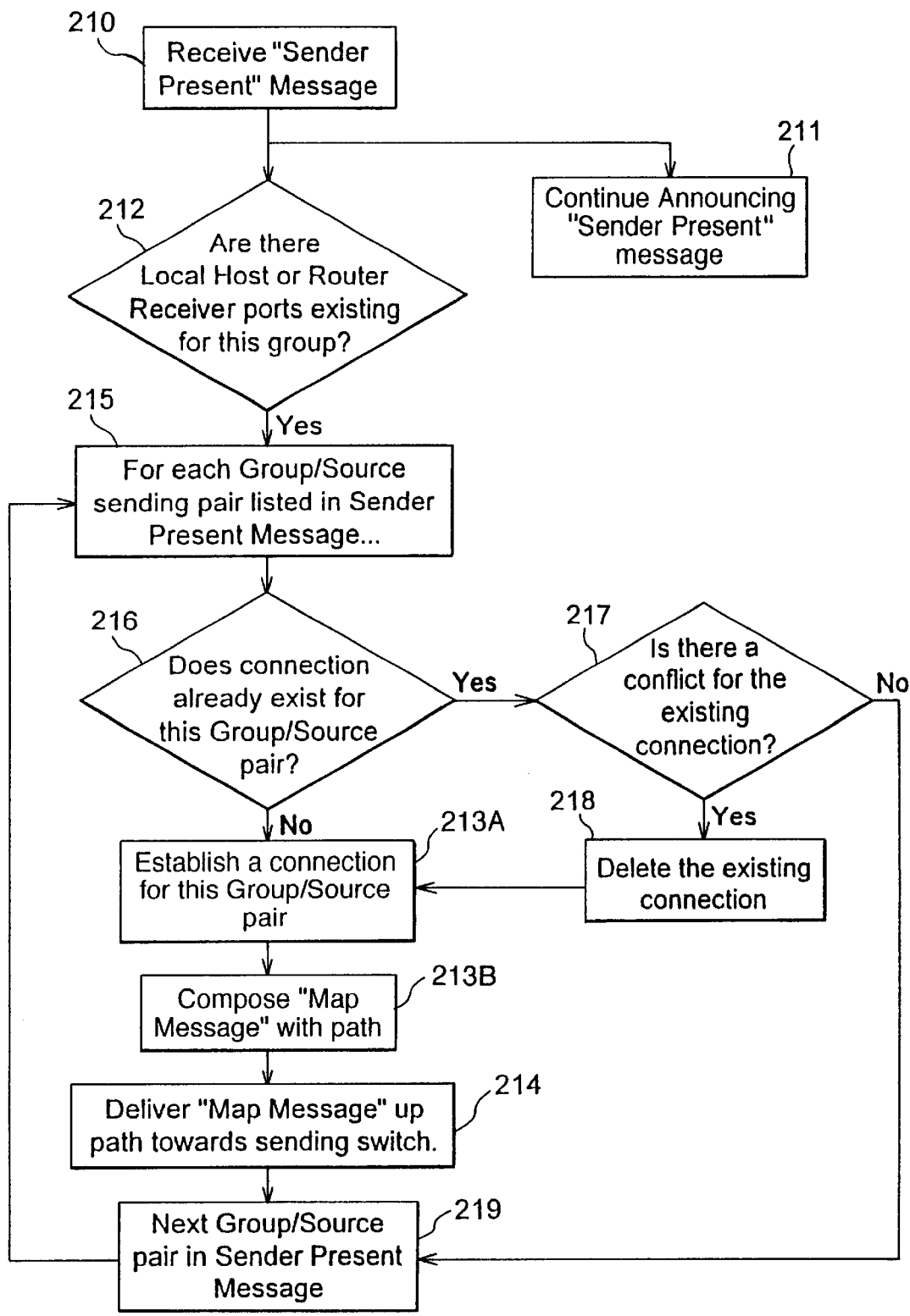
FIG. 8 is a flowchart of the multicasting protocol method of the present invention showing multicast switch processing steps undertaken upon reception of a sender present message.

FIG. 8 describes multicast switch operation in response to receiving a "sender present" message (step 210). A switch receiving this message (i.e., Mcast switches 15–19 in FIG. 5) continues announcing the "sender present" message (step 211) onto all network ports other than the network port which the "sender present" message was received on. The announcement protocol used ensures the reliable delivery of messages and prevents message looping and redundancy. After announcement, the switch then checks for any local host or router receiver ports which may exist and which may be requesting to join the multicast group designated in the "sender present" message (step 212). If IGMP detects that there are local host receivers or routers waiting to join any groups designated in the sender present message, a loop is entered (step 215) for each group/source pair designated in the sender present message. The switch determines if a connection already exists for the group/source pair for this loop iteration (step 216) and if so a conflict check is determined for the existing connection (step 217) much the same way as described above with respect to FIG. 7B. The conflict check in step 217 makes sure each part of the existing connection is correct. If the existing connection has a conflict (i.e., its input port is not proper), the existing connection is deleted (step 218). After deleting the connection, or if a connection did not already exist for the group/source pair in step 216, a connection is made (step 213A) and a "map message" is composed (step 213B) which contains the network path of all intermediate switches between the receiving switch (which is creating and sending the map message) and the source switch (from which the multicast packets originate). The path information entered in the "map message" is obtained from a separate protocol which switches use to maintain path information. The map message with the path information also contains a designation of the multicast source host and group pair for which it is creating connections. The map message containing the return path is then delivered (step 214) up the network path towards the source switch. The next group/source pair in the sender present massage is then processed (step 219) as described previously. Each map message, as will be shown, will cause each intermediate switch along the return path to the source to establish an appropriate source/group connection for multicast packets for this group so that they may be switched through the network to the receiving switch.

Figure 9:
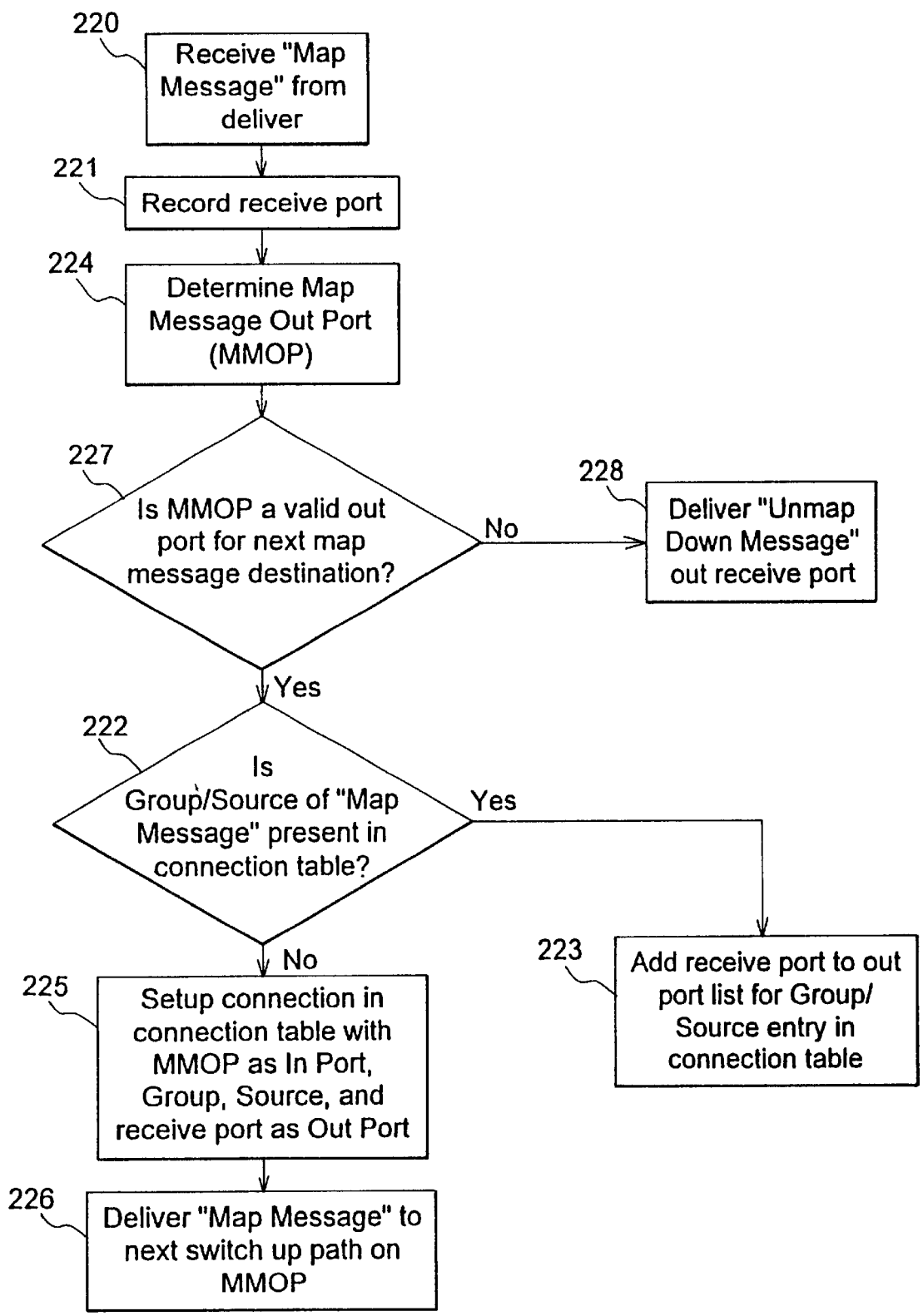
FIG. 9 is a flowchart of the multicasting protocol method of the present invention showing multicast switch processing steps undertaken upon reception of a map message.

FIG. 9 shows the processing a switch performs upon reception of a "map message". After reception of the "map message" (step 220), a switch first records the input port, from which the map message was received, into a received port parameter (step 221). The received port parameter will be used later to establish a connection for the forthcoming multicast packets. Next, the switch examines the return path information contained in the map message to determine the next successive destination switch and therefore determines the map message output port to which the map message will be sent (step 224). Then the switch makes sure that the map message output port is valid (step 227) and if it is not (i.e.: the link is down or a failure exists for the map message output port), an "Unmap Down Message" is sent back out the receive port to the switch which sent the map message. Steps 227 and 228 ensure a connection may be established up towards the source switch, and if not, these steps notify the downstream switch of a failure. In step 222, the switch checks its connection table to determine if a connection exists for the multicast group/source combination identified in the map message. If a connection already exists for this group/source pair, the switch adds the recorded received port parameter value to the output port list for the group/source connection entry in the switch's connection table (step 223). However, in step 222, if the group/source combination does not exist in the connection table, the switch then establishes a connection in a connection table (step 225) containing the multicast group address as the destination address, the map message output port as the input port of the connection, the source host MAC address as the source destination, and the receive port parameter value as the output port for the connection. This connection established in the connection table will switch multicast packets towards the receiving switch which was the originator of the map message. Finally, in step 226, the switch delivers the map message to the next switch on (up) the path towards the source switch by sending the map message onto the map message output port. In this fashion, the processing steps of FIG. 9 cause any switch which receives a map message to create a connection in the connection table for a new receiving switch for that group, or alternatively, to add a multicast packet path to an already existing connection for that group so that the originating switch of the map message may begin receiving multicast packets.

From the foregoing switch processing description, through the use of "sender present" messages and "map messages", the multicasting protocol implemented in the multicast switches of the present invention provides for the "signal out, connect back" methodology. There is no need to flood the network with initial multicast packets to all switches and then prune back a tree to only the desired receivers.

Figure 10:
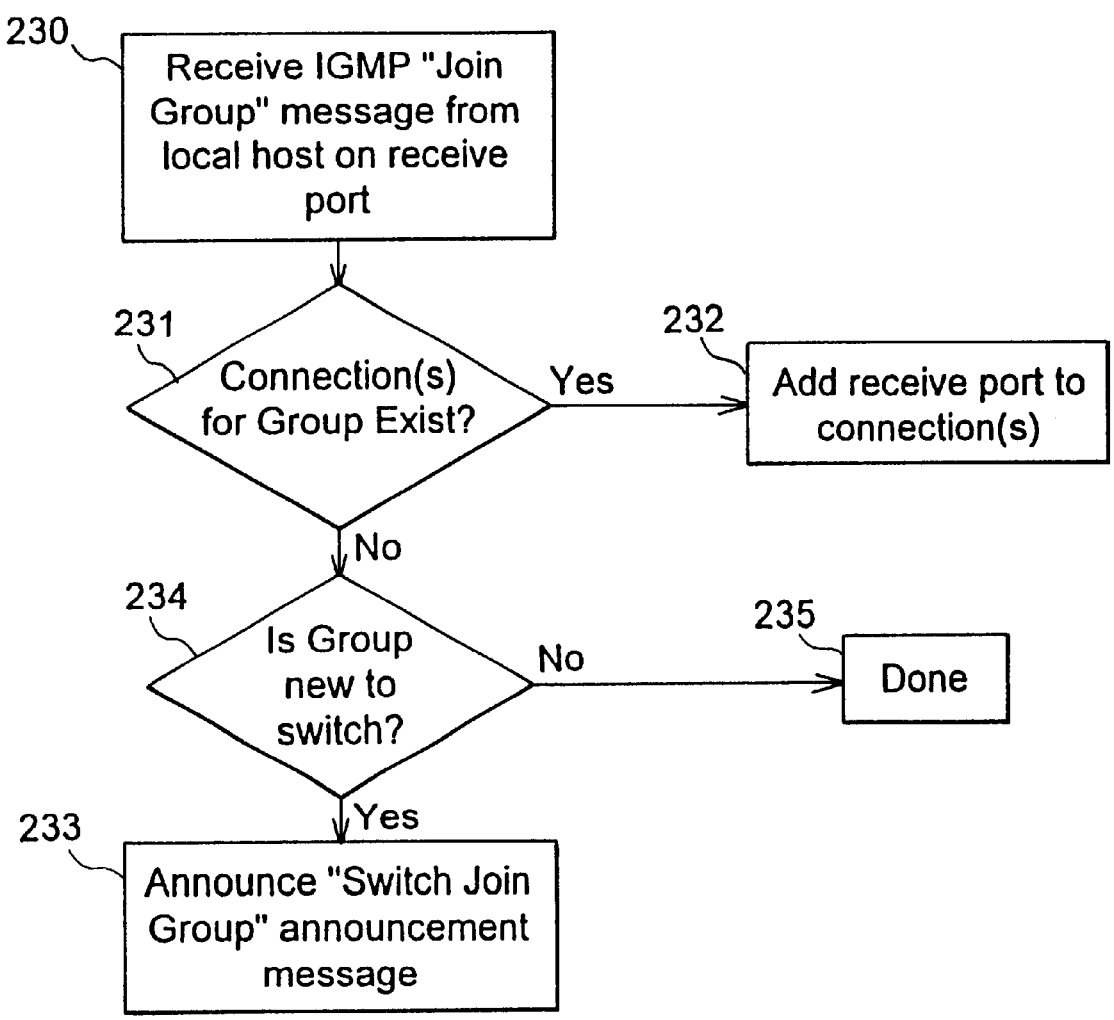
FIG. 10 is a flowchart of the multicasting protocol method of the present invention showing multicast switch processing steps undertaken upon reception of an IGMP Group Join message.

FIG. 10 shows the processing steps a multicast switch performs which allow local hosts of that switch to join multicast group sessions. When a switch receives an IGMP "join group" message from a local host on a receive port (step 230), the switch first checks if connections for that group exist in its connection table (step 231). If connections for that group exist, the switch adds the receive port which the IGMP "join group" message was received from to the connection table (step 232). However, if connections for that group do not exist, the switch determines if the multicast group is new to the switch (step 234). The group may be considered new for example, if the switch has not joined other local hosts to this group. If the group is not new, processing is complete at step 235. However, if the switch does not have local hosts joined to the group, the switch announces a "switch join group" announcement message onto the switching network 233. The switch join group message, as will be shown, reliably notifies other switches that a switch is requesting to join the multicast group requested in the switch join group message.

Figure 11:
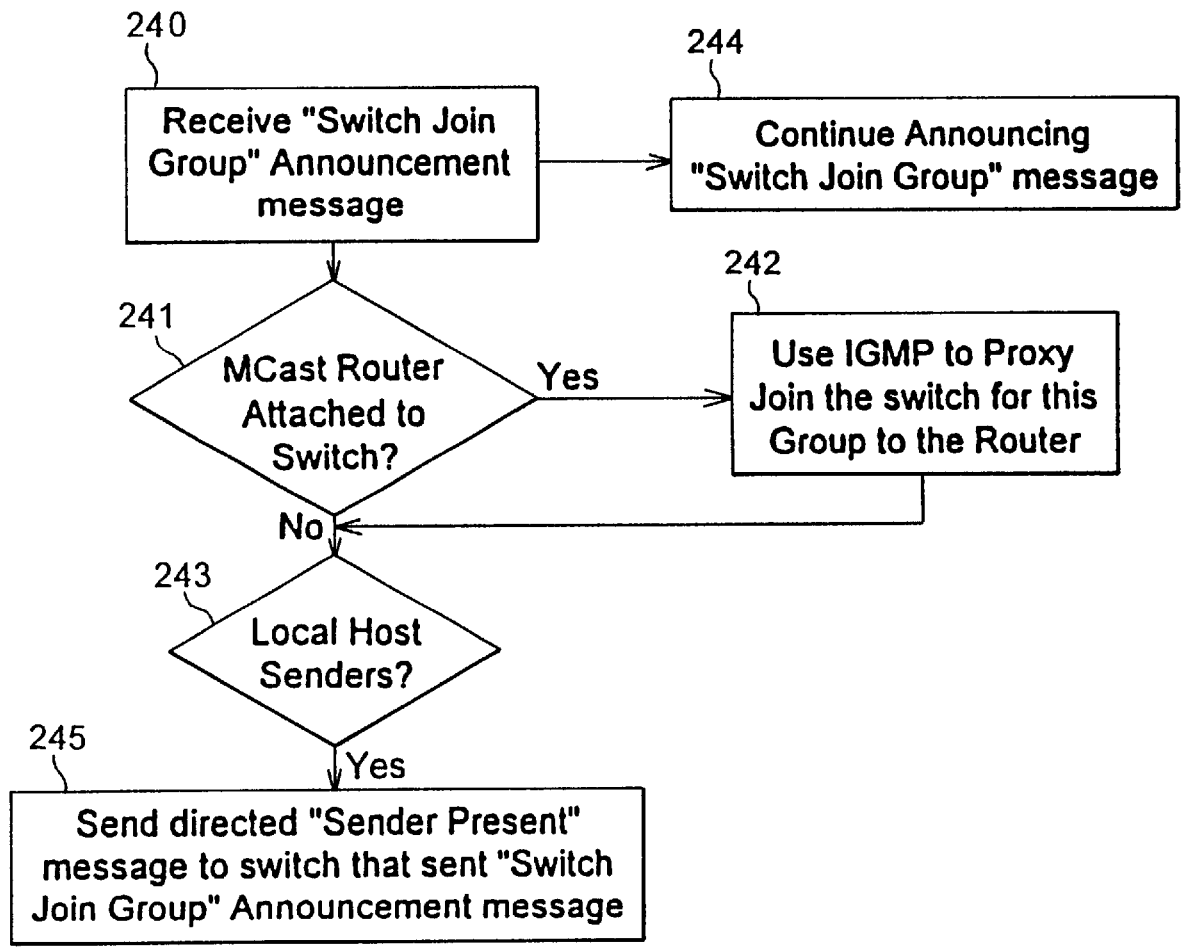
FIG. 11 is a flowchart of the multicasting protocol method of the present invention showing multicast switch processing steps undertaken upon reception of a Switch Join Group message.

FIG. 11 shows the processing steps performed by a switch upon reception of a "switch join group" announcement message (step 240). In this embodiment, the receiving switch continues reliably announcing the switch join group message to other switches (step 244). Next, the receiving switch determines if a multicast router is attached to one of the ports of the switch (step 241) and if so, the switch uses IGMP to "proxy" join the requested multicast group specified within the "switch join group" announcement message to the router attached to the switch (step 242). By using IGMP, the switch appears as a local host to its neighboring router. By proxy joining the requested multicast group, any packets received by the router will be forwarded to the switch network. Steps 241 and 242 then ensure that any multicast packets for the requested group which arrive at the switch network from a router will be properly switched to the appropriate receiving switches. Next, the multicast switch determines if there are any local host sources transmitting multicast packets to the group requested (step 243). If the switch determines that it has local sources transmitting packets to the requested group, the switch sends a directed "sender present" message (step 245) directly to the switch that sent the "switch join group" announcement message.

The processing in FIG. 11 allows each switch in the network to notify the originator of the "switch join group" message if it has either local host senders to the requested group, or if it has an attached router which may also be providing multicast packets to the switch network for the requested group. The IGMP proxy join alerts the router that the switch is both a sender and a receiver for multicast packets to the group. This allows any switch with an attached router to become a proxy switch for multicast group packets between a switching network and a router network. In an alternative embodiment, steps 241 and 242 may be omitted for a case in which multicast switches in a switch network have no attached routers.

The following FIGS. 12–17 describe the switch processing which allows the removal of multicast connections within the network and also allows for failure processing in the event that a host, switch or communications link goes down.

Figure 12:
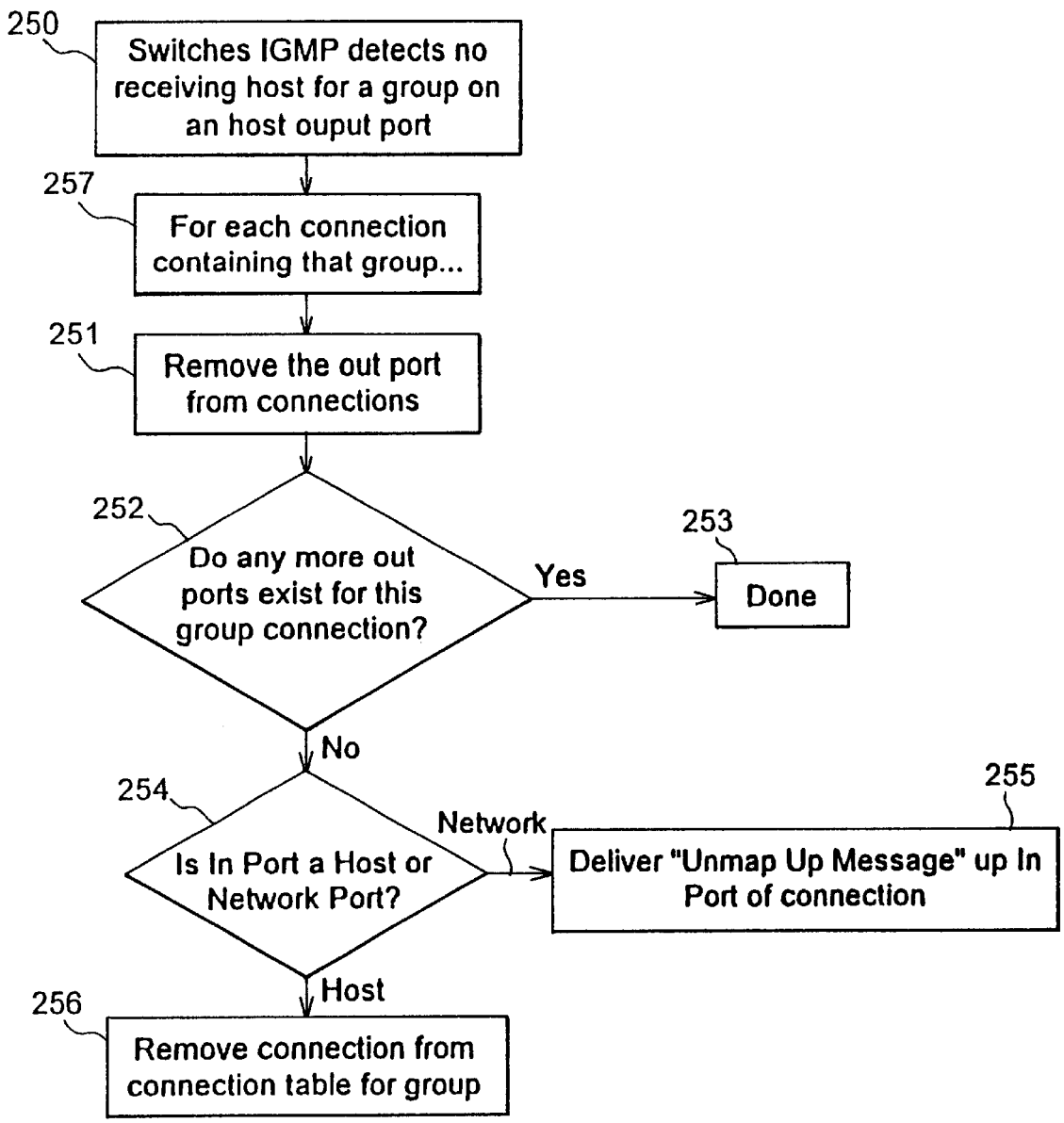
FIG. 12 is a flowchart of the multicasting protocol method of the present invention showing multicast switch processing steps undertaken when a multicast switch detects that there is no receiving host for a multicast group.

FIG. 12 shows the processing steps a multicast switch performs when that switch's IGMP detects no local receiving hosts for a multicast group on an output port connected to a local host link (step 250). As previously mentioned, IGMP running on a switch periodically polls all of that switch's local hosts for multicast group membership. If IGMP detects that no local hosts have responded to a specific multicast group poll message on a specific output port, for each connection in the connection table containing that group (step 257), the switch removes that output port from the connections for that particular multicast group in the connection table (step 251). The switch then determines if any more output ports exist for that multicast group connection (step 252). If there are other output ports still existing for the group connection in the connection table, processing is completed is step 253. However, if the multicast group connection in the connection table no longer contains any output ports, the switch determines if the input port for the connection for that multicast group is a host or network port (step 254). If the input port is connected to a host link, the switch removes this connection for that multicast group from the connection table (step 256). In step 254, if the input port is a network port (i.e., connected to a network link), the switch composes and delivers an "unmap up" message on the input port listed for that connection (step 255). Then processing returns to step 257 for the next entry in the connection table listing the group detected in step 250.

In this manner, switch processing removes multicast connections from a connection table which no longer contain any output ports for the multicast packets and which designate host links as their input ports. However, if the input port is a network port, and no more output ports exist for a multicast group connection in the connection table, the switch sends an unmap up message onto the input port designated in the connection. This unmap up message will notify the switch at the receiving end that the local switch no longer needs to receive multicast packets for this particular group, as will be described.

Figure 13:
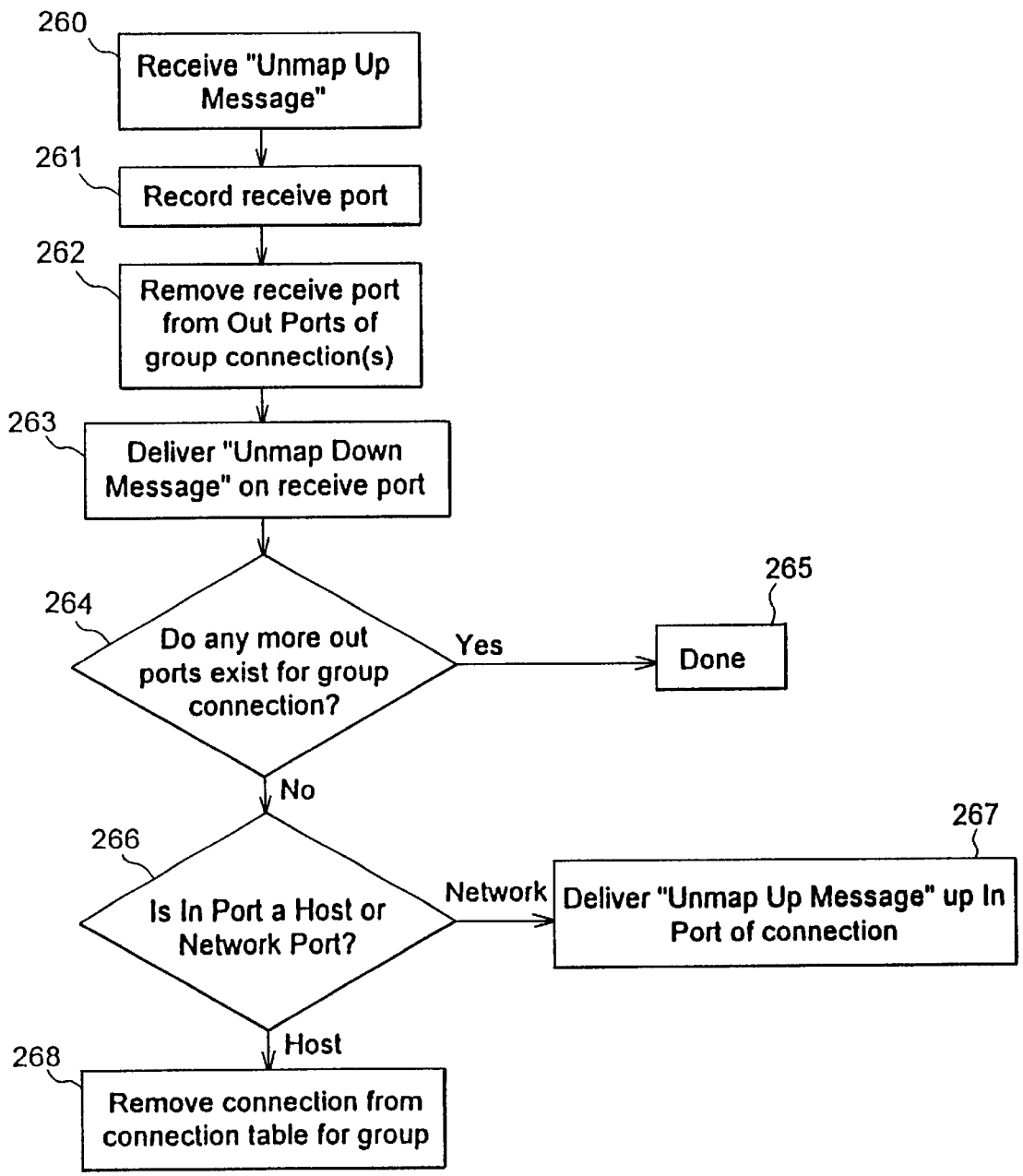
FIG. 13 is a flowchart of the multicasting protocol method of the present invention showing multicast switch processing steps undertaken upon reception of an Unmap Up message.

FIG. 13 shows the steps a switch undertakes in response to receiving an "unmap up" message (step 260). The switch first records the receive port number on which the "unmap up" message was received(step 261). The receive port number is then removed from the output port of each multicast group entry in the connection table for the switch (step 262). The switch then delivers an "unmap down" message on the receive port (step 263), which serves as an acknowledgment of the reception of the "unmap up" message. Next, the switch determines if there are any more output ports for the multicast group connection being unmapped (step 264). If other output ports exist for this group connection, the processing finishes (step 265). However, if there are no more output ports listed for the multicast group connection, the switch determines if the input port for the connection is a host link or network link port (step 266). If the input port listed for the connection is a network port, the switch delivers an "unmap up" message onto the input port listed in the groups connection (step 267). However, at step 266, if the input port is a host port, the connection itself is removed from the connection table for the multicast group (step 268).

The combined processing of steps 260–268 in FIG. 13 cause a multicast switch to adjust or remove the appropriate multicast connections based on the received unmap message. Furthermore, if the switch receiving such a message serves as an intermediate switch only (i.e., has no local hosts for the multicast group), step 267 insures that the unmap up message is further propagated to the next switch up the data stream of the multicast packets. The unmap up message is thus used to successively remove multicast group connections from connection tables in switches where there are no local or network receivers to accept the packets.

Figure 14:
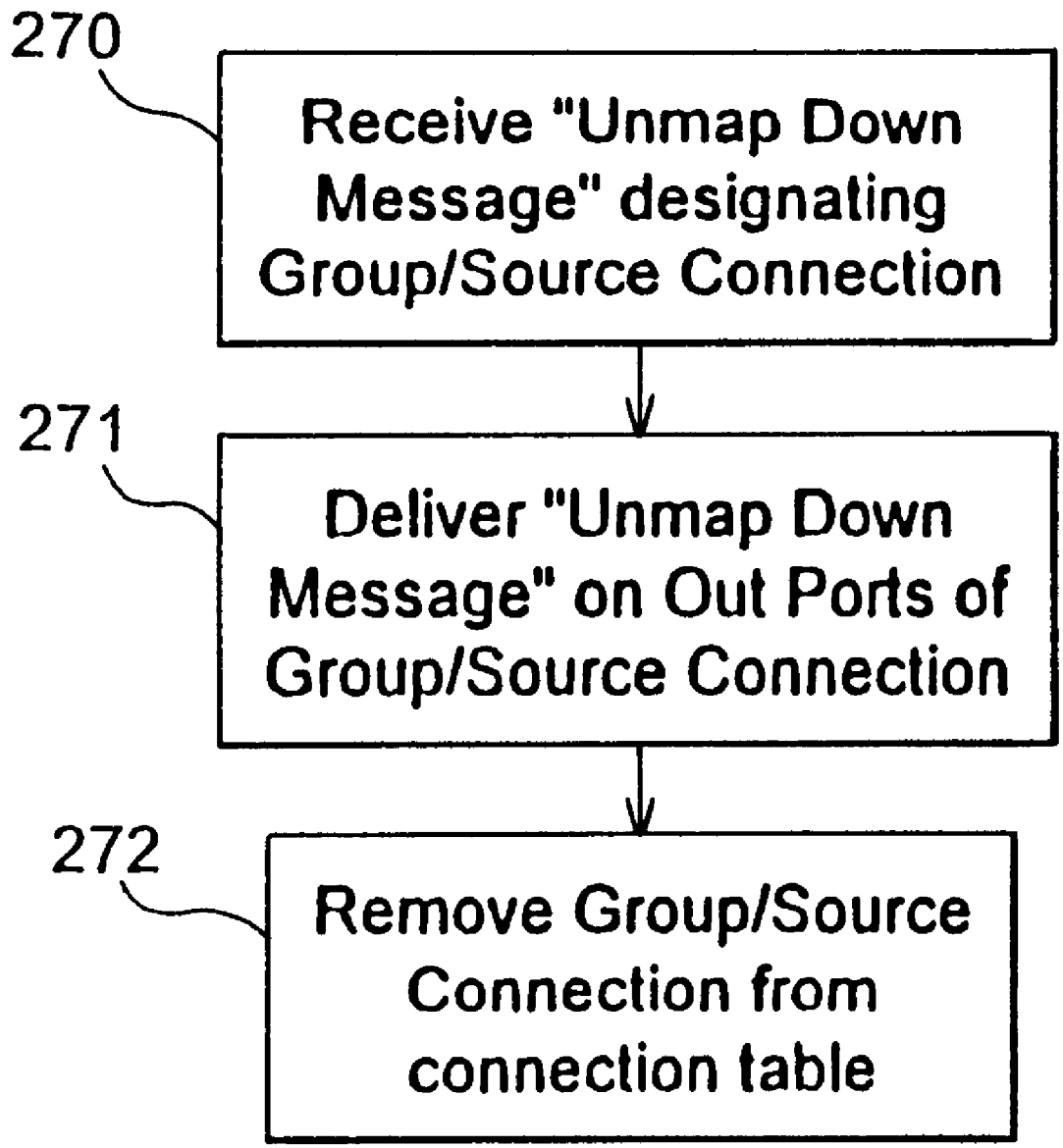
FIG. 14 is a flowchart of the multicasting protocol method of the present invention showing multicast switch processing steps undertaken upon reception of an Unmap Down message.

FIG. 14 shows the processing steps a switch performs upon reception of an "unmap down" message; this serves as an acknowledgment to a previously sent "unmap up" message. After the "unmap down" message is received (step 270), the unmap down message is delivered on all output ports for the group/source connection pair in the switch's connection table (step 271). Step 271 ensures that any down stream switches in the multicast packet flow, which may be expecting multicast packets to be forwarded by the switch performing the processing of FIG. 14, should no longer expect delivery of these packets from the upstream switch. After propagation of the "unmap down" message to down stream switches or hosts on the output ports, the switch removes the group/source connection from the connection table (step 272).

Figure 15:
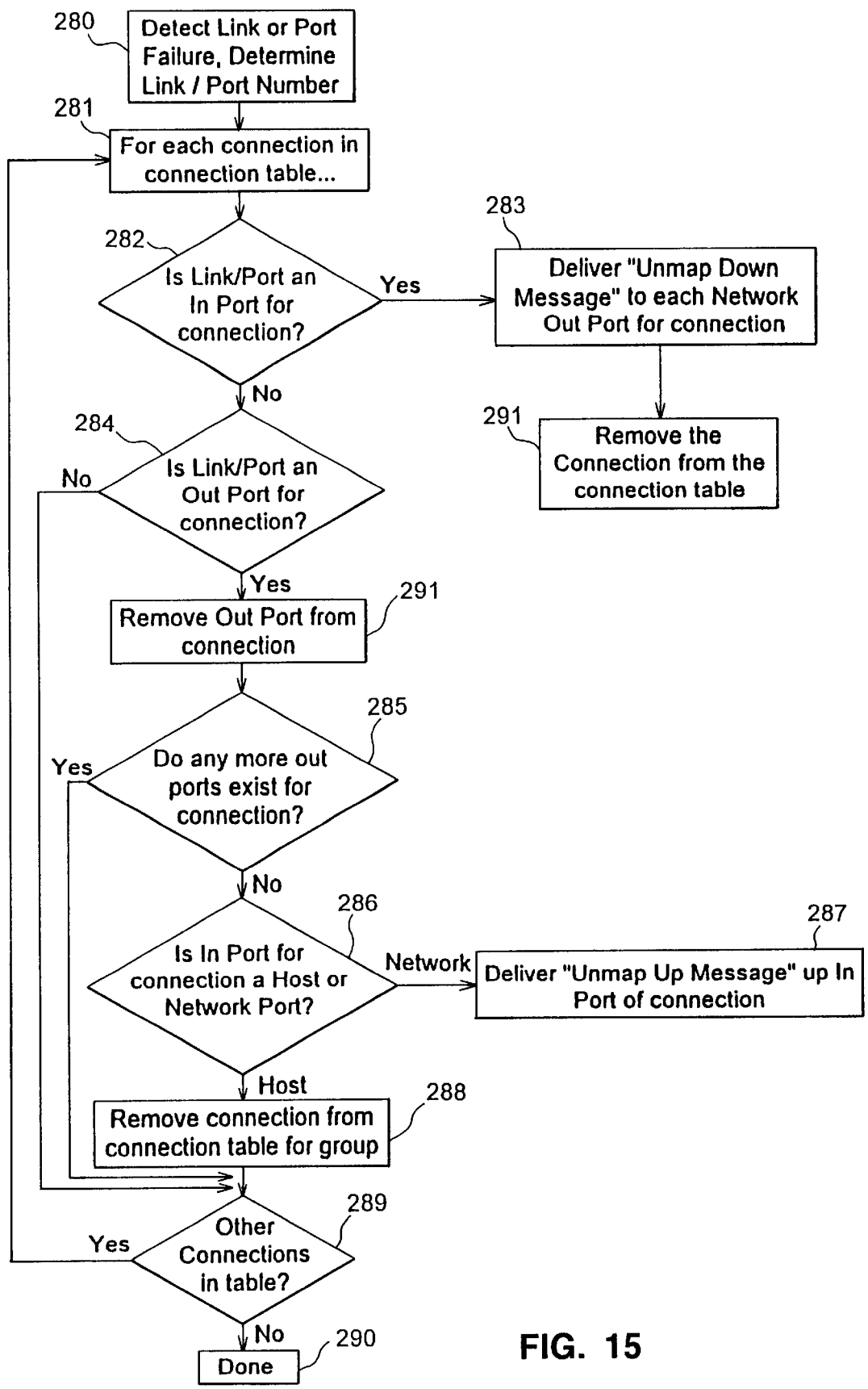
FIG. 15 is a flowchart of the multicasting protocol method of the present invention showing multicast switch processing steps undertaken when a multicast switch detects a link or port failure.

FIG. 15 shows the processing steps according to one embodiment which a switch performs upon detection of a link or port failure. When such a failure is detected, the multicast switch determines the port number upon which the failure occurred (step 280). The switch then enters a loop to examine each connection in its connection table (step 281) to determine if any of the connections are effected by the link or port failure. For each connection, the switch determines if the port or link is an input port for the particular connection (step 282), and if it is, the switch delivers an "unmap down" message to each network output port listed for that connection (step 283) in the connection table and deletes this connection (step 291). Steps 282 and 283 provide notification to the downstream switches that the present switch will no longer be able to provide multicast packets since a link or port at which the packets arrive is no longer functional. If the failed link or port is not an input port for the current connection being examined, the switch determines if it is an output port for the connection (step 284), and if not, proceeds to the next connection in the table (step 289). However, if the current connection being examined does list the failed port as an output port (step 284), the switch removes the output port from the connection (step 291) and then determines if there are other output ports which exist for the connection, besides the failed port (step 285). If there are other output ports, then the connection may be maintained and processing proceeds to the next connection (step 289). However, if the only output port listed for a connection is the failed port, the switch determines if the connection's input port is a host or network link input port (step 286). If it is a network link, the switch delivers an "unmap up" message up the input port listed for the connection (step 287). The "unmap up" message notifies the up stream switch that this switch cannot forward any multicast packets further than itself due to a failed port. However, if the input port for the connection containing a failed output port is a host port, the group/source connection is removed from the connection table for that group (step 288). Processing then proceeds to successive connections in the connection table (step 289). After all connections have been processed for the failed link or port, processing completes at step 290.

From the foregoing description, when a link or port fails, the switch uses unmap down and unmap up messages to notify either down stream or up stream switches of the failure and adjusts its connection table accordingly.

Figure 16:
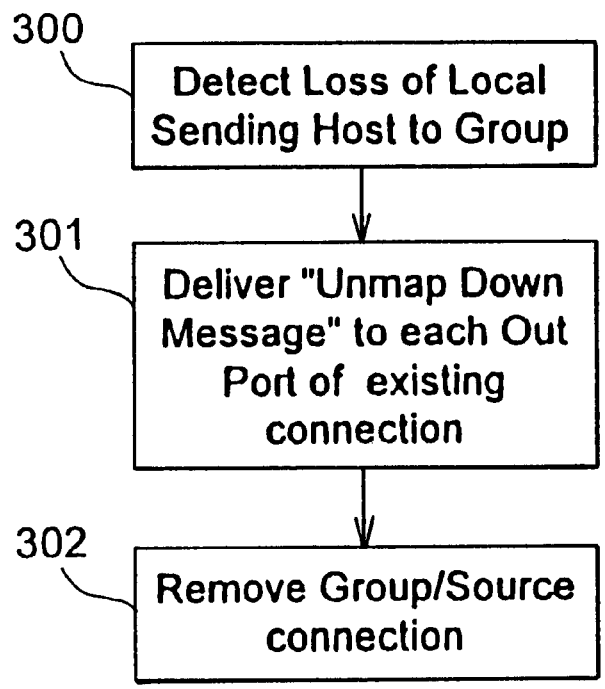
FIG. 16 is a flowchart of the multicasting protocol method of the present invention showing multicast switch processing steps undertaken when a multicast switch detects the loss of a local sending host to a multicast group.

FIG. 16 describes the switch processing upon detecting the loss of a local sending host (i.e., a source) to a multicast group (step 300). When a local host source stops sending multicast packets to the group, its local switch detects this after a predetermined timeout period and delivers an "unmap down" message to each output port listed in the existing connection for that group/source pair in the connection table (step 301). Then the switch removes the group/source connection pair from the connection table (step 302). Accordingly, when a local host source on a switch stops sending to a multicast group, the local switch, after a period of time, begins the propagation of the unmap down message which removes all connections within the network for the group/source packets for that multicast group. Thus, any switch in the network which switches packets matched to the tuple for that specific multicast group and that specific source host, will in turn remove the appropriate connections.

Figure 17:
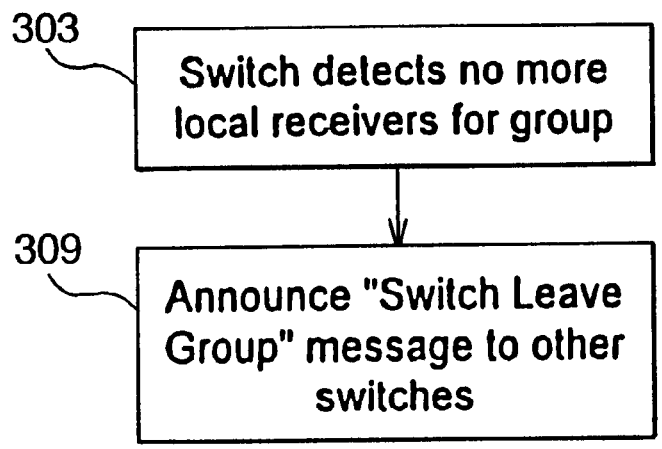
FIG. 17 is a flowchart of the multicasting protocol method of the present invention showing multicast switch processing steps undertaken when a multicast switch detects that there are no more receivers for a multicast group.

FIG. 17 shows the processing a switch undertakes when the switch detects there are no more local receivers for a multicast group (step 303). In this case, the switch announces via a "Switch Leave Group" message sent to all other switches (step 309) that this switch no longer needs to receive packets for the particular multicast group. This message may be primarily used for the switches which handle proxy joining of groups to router networks. A switch with a neighboring router may keep track of which groups are needed to be sent from the router network to the switch network. Thus, when a switch no longer has subscribers to a group, it notifies the switching network and the proxy switches keep track of switch group membership as will be explained with respect to FIG. 18.

Figure 18:
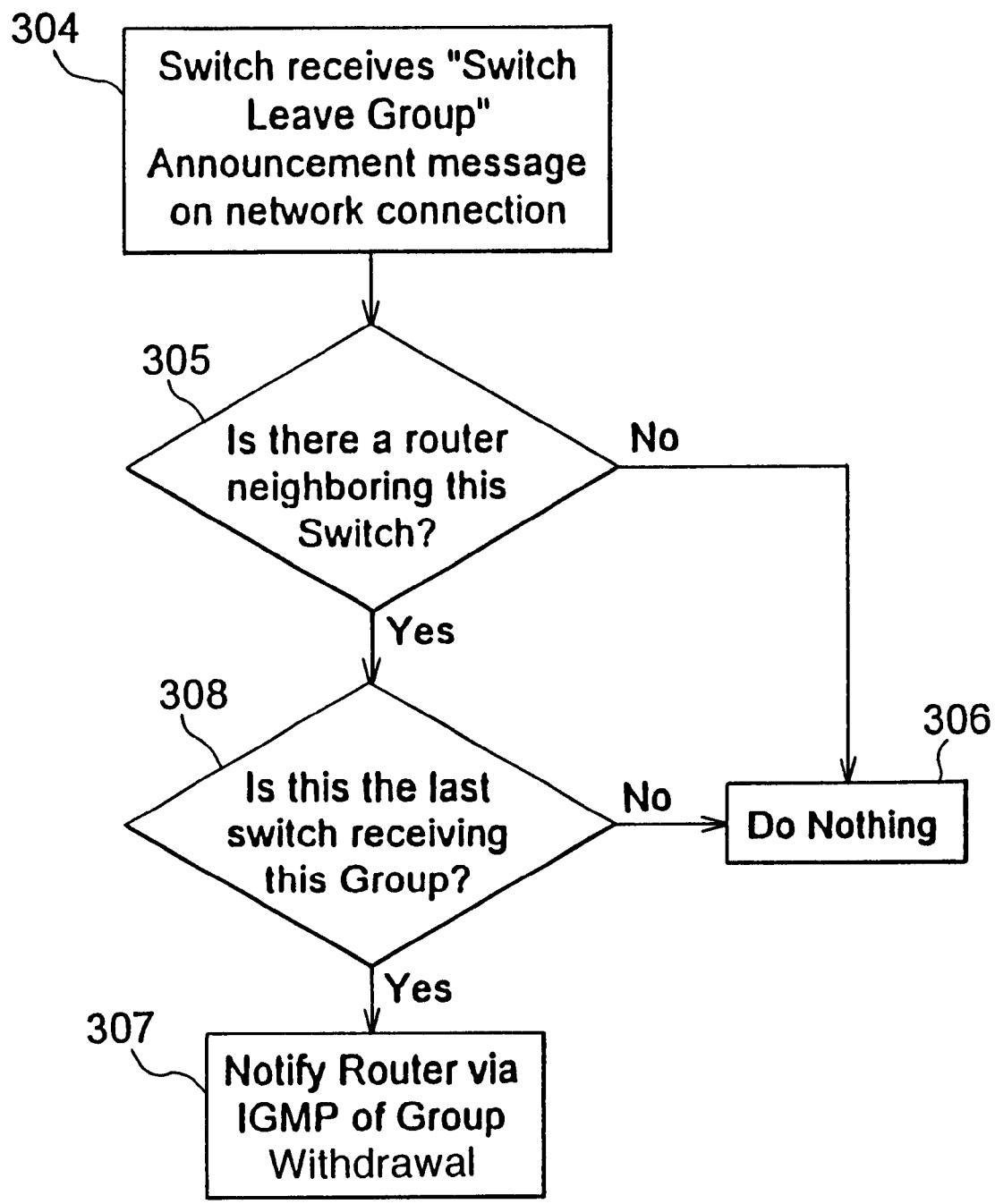
FIG. 18 is a flowchart of the multicasting protocol method of the present invention showing multicast switch processing steps undertaken by a proxy multicast switch upon reception of a Switch Leave Group message.

FIG. 18 shows the processing a switch undertakes according to one embodiment after receiving a "Switch Leave Group" message (Step 304). If there is a router attached to this switch (step 305), the switch checks a database to determine if there are any more switches receiving packets for this multicast group on the switch network (step 308). If there are no more switches receiving this group, the switch notifies the router via IGMP that the router no longer needs to forward packets for this group to the switch network (step 307). If there is no neighboring router (step 305) or there are other switches still receiving the group packet in the switch network (step 308), the switch does nothing (step 306). If this fashion, switch leave group messages may be used to track overall switch network group membership and can allow a switch attached to a router network (i.e.: a proxy switch) to request or remove group membership from the router network.

Figure 19:
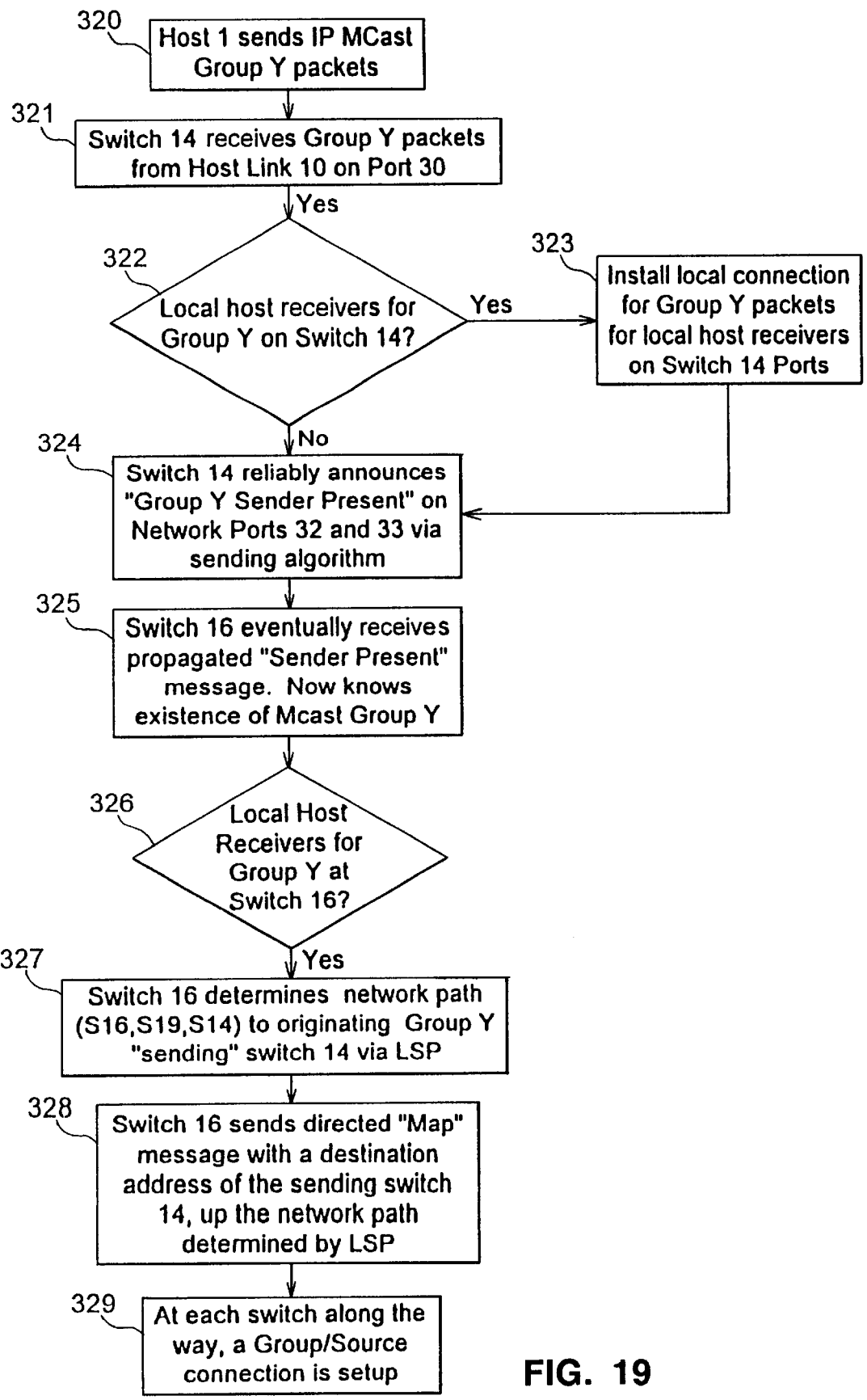
FIG. 19 is a flowchart illustrating an example of a multicast communications session being set up between multicast switches according to one embodiment of the present invention.

An example will now be described of these processing steps in relation to FIGS. 5 and 6 and the flow chart of FIG. 19.

In FIG. 5, assume multicast host 1 begins transmitting multicast packets containing "QRS" video data addressed to multicast group Y (step 320). Multicast switch 14 receives the new group Y packets over host link 10 on port 30 (step 321), as shown in the exploded view of switch 14 in FIG. 6. Multicast switch 14 determines if there are any local host receivers requesting to join group Y on other host links besides host link 10 (step 322). For example, multicast host 2 may use IGMP to join group Y, and if so, multicast switch 14 will establish a local group/source connection for the group Y packets from host 1 in its connection table (step 323 in FIG. 19). After handling local connection step up, multicast switch 14 then reliably announces multicast Group Y's presence via a "group Y sender present" message on all network ports (step 324). Multicast switch 14 becomes a source switch for group Y packets. In FIG. 5, this message would be transmitted on network links 24 and 20 to multicast switches 19 and 15, respectively. As the "sender present" message from switch 14 propagates through the switch network 28, each switch 15–19 performs the processing as previously described in FIG. 8.

Suppose for this example, that multicast host 3 has signaled to its local multicast switch 16, via IGMP, that it wants to receive group Y multicast packets (i.e., to join group Y). Multicast switch 16 will eventually receive the propagated "sender present" message (step 325) and will now be "aware" of the existence of the multicast group Y. Switch 16 then determines if there are local host receivers requesting to join group Y (step 326). Since host 3 has made such a request, switch 16 then determines, via a known protocol which keeps track of the best network paths between switches, the best path through the switch network back to the source switch (step 327). Once the best return path to the source switch has been determined, switch 16 composes a map message containing this return path and a designation of the multicast group Y and source host address which is being joined, and sends this map message out the network port of switch 16 towards the sending switch, along the predetermined best network path (step 328). As previously described, as the map message travels along the predetermined path back to the source switch of the group Y multicast packets, a connection is established for the group/source pair in the connection table of each intermediate switch (step 329). When the map message reaches the original source switch, and last connection is established in source switch 14's connection table, the multicast packets will begin to be switched through the switching network to the receiving multicast host 3.

Figure 20:
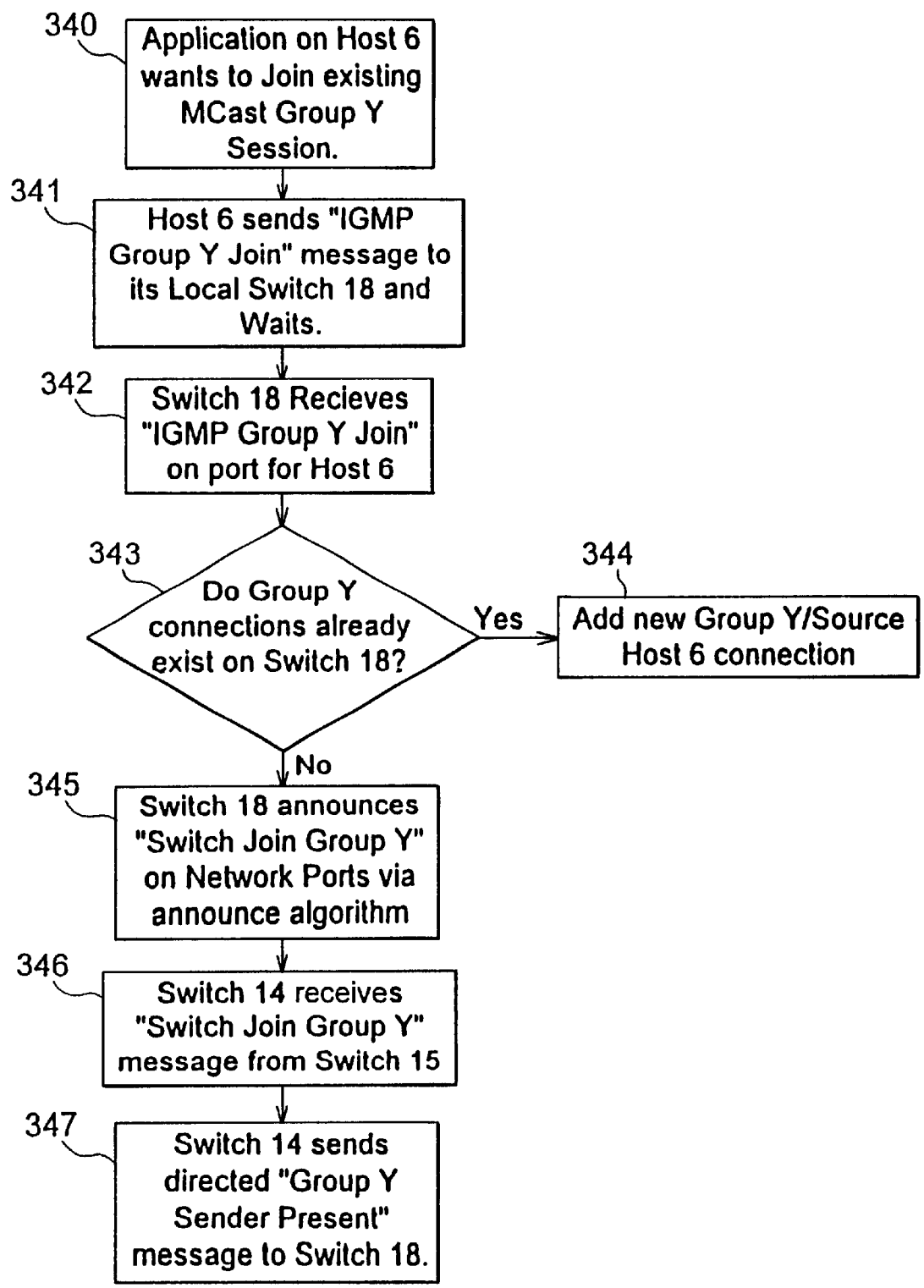
FIG. 20 is a flowchart illustrating an example of a multicast communications session being joined by a local host of a multicast switch according to one embodiment of the present invention.

FIG. 20 describes another embodiment of the invention in which a multicast host may join, via its local switch, to a multicast group session which is already being transmitted within a switch network. For example, suppose the processing steps previously described with respect to FIG. 19 have been completed and there is now an existing multicast session taking place between sending host 1 and receiving host 3 along the network path through multicast switches 14, 19 and 16. Further suppose that a multicast software application running on multicast host 6 for example, wants to join the existing multicast group Y session (step 340 in FIG. 20). The multicast host application directs multicast host 6 to send an "IGMP Group Y join" request to its local multicast switch 18, and then waits for the multicast packets (step 341). Multicast switch 18 receives the "IGMP Group Y join" request on the port connected to host link 13 (step 342). Switch 18 first determines (as per processing in FIG. 10) if any group Y connections already exist in its connection table (step 343 in FIG. 20). If such connections exist, the output port for host 6 is added to the existing connection for the group Y multicast packets (step 344 in the local connection table). If no connections exist for group Y, switch 18 announces a "switch join group Y" message on all of its network ports (step 345). This processing was previously described with respect to FIGS. 10 and 11. In FIG. 5, when the "switch join group Y" message has propagated back to the source switch 14 (step 346), switch 14 then sends a directed "group Y sender present" message directly to switch 18 (step 347). This processing was described in FIG. 11. Then, as previously discussed, when the sender present message reaches switch 18, switch 18 performs the processing according to the reception of a sender present message as described in FIG. 8. Switch 18 sends a "map" message back up the network path towards source switch 14 which establishes a connection for the multicast packets for group Y at each intermediate switch (i.e., switches 14 and 15 for example).

Various embodiments of the present invention have thus been described including an apparatus and processing steps which allow multicasting to be implemented across a switched network. These and other modifications of the invention will be apparent to those skilled in the art and are intended to be within the scope of this invention.

What is claimed is:

1. In a switched-based communications network including a plurality of hosts and switches connected by links, each switch having at least one network port connected to another switch and at least some switches having access ports connected to hosts, each host having a unique address, and each switch including a connection database of valid connections between different ports on the switch and a switching setup mechanism for establishing temporary connections between the different ports on the switch, the improvement comprising a method for processing multicast packets comprising steps of:

receiving, at a source switch, a multicast packet on an access port from a source host;

determining, by the source switch, a group address from the multicast packet; and composing and sending, by the source switch, a sender present message, containing the group address and the source host address, to other switches on its network ports wherein a receiving switch receives the sender present message and determines whether a local host attached to one of its access ports wishes to join the group address identified in the sender present message;

if yes, the receiving switch composes and sends a map message toward the source switch on a predetermined path, the map message containing the group address, the source host address and the predetermined path between the receiving switch and the source switch.

2. The method of claim 1, wherein a switch receiving the map message determines if there is an entry in its connection table for the group address and the source host address, and if yes, adds an outport to the entry identifying the port on which the map message was received.

3. The method of claim 1, wherein prior to sending the sender present message the source switch establishes an entry in its connection table for the group address and the source host address and an outport with one of:

(a) no ports; or (b) an outport identifying any access ports to local hosts that wish to join the group address.

4. The method of claim 1, wherein a switch receiving the map message determines if there is an entry in its connection table for the group address and the source host address, and if no, adds an entry to its connection table for the group address, the source host address, an inport identifying the port directed toward the source switch according to the predetermined path, and an outport identifying the port on which the map message was received.

5. The method of claim 4, wherein if the receiving switch is not the source switch, the receiving switch sends the map message on the predetermined path toward the source switch.

6. The method of claim 4, wherein each switch receives the map message and only switches on the predetermined path implement the determines step.

7. The method of claim 3 wherein when the source switch receives the map message it adds to its entry in the connection table for the group address and source host address an outport identifying the network port on which it received the map message.

8. The method of claim 2, wherein each switch on the predetermined path switches multicast packets based on its connection table entry.

9. The method of claim 8, wherein the packet switching is implemented in hardware.

10. The method of claim 8, wherein multiple source hosts are sending multicast packets containing one or more group addresses.

11. The method of claim 8, wherein:

a local switch determines whether a local host connected to one of its access ports wishes to join a designated group address;

if so, the local switch checks its connection table for an entry identifying the designated group address;

if yes, the local switch adds the access port on which the local host is connected as an outport for the connection table entry;

if not, the local switch composes and sends a join group message to the other switches, the join group message containing the designated group address and the local switch address.

12. The method of claim 11, wherein the join group message is sent to all other switches.

13. The method of claim 11, wherein:

a switch receiving the join group message determines if a local host connected to any one of its access ports is the source host for the designated group address identified in the join group message;

if yes, the switch sends a sender present message to the local switch.

14. The method of claim 11, wherein:
a switch receiving the join group message determines if a router is attached to any one of its access ports;
if yes, the switch notifies the router that the switch wishes to join the designated group address identified in the join group message.

15. In a switched communications network including a plurality of hosts and switches connected by links, each switch having at least one network port connected to another switch and at least some switches having access ports connected to hosts, each host having a unique address, each switch including a connection database of valid connections between different ports on the switch and a switching setup mechanism for establishing temporary connections between the different ports on the switch, the improvement comprising a method of processing multicast packets comprising steps of:
determining, at a local switch whether a local host connected to one of its access ports wishes to join a designated group address;
if so, checking, at the local switch a connection table for an entry identifying the designated group address;
if the entry exists, adding, by the local switch, the access port on which the local host is connected as an outport to the connection table entry; and
if the entry does not exist, composing and sending, by the local switch, a join group message to the other switches along predetermined paths formed between switches, the join group message containing the designated group address and the local switch address.

16. The method of claim 15, wherein if the local switch receives no response to the join group message, the local switch maintains for some time period the wish of the local host to join the designated group address.

17. In a switched-based communications network including a plurality of hosts and switches connected by links, each switch having at least one network port connected to another switch and at least some switches having access ports connected to hosts, each host having a unique address, and each switch including a connection database of valid connections between different ports on the switch and a switching setup mechanism for establishing temporary connections between the different ports on the switch, the improvement comprising a method for processing multicast packets comprising steps of:
determining, at a local switch, if the local switch has a local router attached to an access port and if so, adding, by the local switch, an identification of the port attached to the router to a database for forwarding and/or receipt of multicast group packets between a switching network and a routing network.

18. The method of claim 17, wherein the database is periodically refreshed with an identification of multicast group addresses and source host addresses.

19. The method of claim 17, wherein the local switch sends a router present message to other switches;
each receiving switch responds with a group present message identifying the group addresses to which its attached hosts are joined; and
the local switch notifies the router of its desire to receive multicast packets for all designated group addresses.

20. In a switched-based communications network including a plurality of hosts and switches connected by links, each switch having a source address and at least one network port connected to another switch and at least some switches having access ports connected to hosts, each host having a unique address, and each switch including a connection database of valid connections between different ports on the switch and a switching setup mechanism for establishing temporary connections between the different ports on the switch, the improvement comprising a switch for processing multicast packets including:
means for receiving a multicast packet on an access port from a source host;
means for determining a group address from the multicast packet; and
means for composing and sending a sender present message, containing the group address, the source host address, and source switch address, to other switches on its network ports.

21. In a switched-based communications network including a plurality of hosts and switches connected by links, each switch having at least one network port connected to another switch and at least some switches having access ports connected to hosts, each host having a unique address, and each switch including a connection database of valid connections between different ports on the switch and a switching setup mechanism for establishing temporary connections between the different ports on the switch, the improvement comprising a method for processing multicast packets comprising steps of:
receiving, at a source switch, a multicast packet on an access port from a source host;
performing at least one of a group of actions including buffering and discarding of one or more multicast packets until a connection is established to a host designated as a receiver of the multicast packet,
determining, by the source switch, a group address from the multicast packet; and
composing and sending, by the source switch, a sender present message, containing the group address and the source host address, to other switches on its network ports.

22. The method of claim 21, wherein:
a receiving switch receives the sender present message and determines whether a local host attached to one of its access ports wishes to join the group address identified in the sender present message;
if yes, the receiving switch composes and sends a map message toward the source switch on a predetermined path, the map message containing the group address, the source host address and the predetermined path between the receiving switch and the source switch.

23. The method of claim 22, further comprising programming the connection along the predetermined path between the source host and host designated as a receiver.

24. The method of claims 22, wherein a switch receiving the map message determines if there is an entry in its connection table for the group address and the source host address, and if yes, adds an outport to the entry identifying the port on which the map message was received.

25. The method of claim 21, wherein prior to sending the sender present message the source switch establishes an entry in its connection table for the group address and the source host address and an outport with one of:
(a) no ports; or
(b) an outport identifying any access ports to local hosts that wish to join the group address.

26. The method of claim 22, wherein a switch receiving the map message determines if there is an entry in its connection table for the group address and the source host address, and if no, adds an entry to its connection table for the group address, the source host address, an inport identifying the port directed toward the source switch according to the predetermined path, and an outport identifying the port on which the map message was received.

27. The method of claim 26, wherein if the receiving switch is not the source switch, the receiving switch sends the map message on the predetermined path toward the source switch.

28. The method of claim 26, wherein each switch receives the map message and only switches on the predetermined path implement the determines step.

29. The method of claim 25, wherein when the source switch receives the map message it adds to its entry in the connection table for the group address and source host address an outport identifying the network port on which it received the map message.

30. The method of claim 24, wherein each switch on the predetermined path switches multicast packets based on its connection table entry.

31. The method of claim 30, wherein the packet switching is implemented in hardware.

32. The method of claim 30, wherein multiple source hosts are sending multicast packets containing one or more group addresses.

33. The method of claim 30, wherein:

a local switch determines whether a local host connected to one of its access ports wishes to join a designated group address;

if so, the local switch checks its connection table for an entry identifying the designated group address;

if yes, the local switch adds the access port on which the local host is connected as an outport for the connection table entry;

if not, the local switch composes and sends a join group message to the other switches, the join group message containing the designated group address and the local switch address.

34. The method of claim 33, wherein the join group message is sent to all other switches.

35. The method of claim 33, wherein:

a switch receiving the join group message determines if a local host connected to any one of its access ports is the source host for the designated group address identified in the join group message;

if yes, the switch sends a sender present message to the local switch.

36. The method of claim 33, wherein:

a switch receiving the join group message determines if a router is attached to any one of its access ports;

if so, the switch notifies the router that the switch wishes to join the designated group address identified in the join group message.

* * * * *